United States Patent
Akiba

(10) Patent No.: US 6,414,934 B1
(45) Date of Patent: Jul. 2, 2002

(54) PICKUP ADJUSTING MECHANISM

(75) Inventor: Takao Akiba, Ohmiya (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/243,904

(22) Filed: Feb. 3, 1999

(30) Foreign Application Priority Data

Feb. 6, 1998 (JP) .......................... 10-025634
Jan. 11, 1999 (JP) .......................... 11-004047

(51) Int. Cl.$^7$ .............................................. G11B 21/24
(52) U.S. Cl. ...................................... 369/249; 369/219
(58) Field of Search ................................. 369/215, 219, 369/244, 258, 75.1–77.2, 249

(56) References Cited

U.S. PATENT DOCUMENTS

| 4,947,481 A | * | 8/1990 | Ikedo et al. ................ 369/215 |
| 4,953,154 A | * | 8/1990 | Takahara et al. ............ 369/195 |
| 5,008,873 A | * | 4/1991 | Tanaka et al. ........... 369/44.14 |
| 5,097,465 A | * | 3/1992 | Funabashi et al. .......... 369/199 |
| 5,107,478 A | * | 4/1992 | Tamaru et al. ........... 369/44.32 |
| 5,132,534 A | * | 7/1992 | Namigawara ............... 250/239 |
| 5,172,370 A | * | 12/1992 | Suzuki ....................... 369/258 |
| 5,311,497 A | * | 5/1994 | Takizawa et al. ........... 369/219 |
| 5,615,204 A | * | 3/1997 | Watanabe et al. .......... 369/247 |
| 5,982,735 A | * | 11/1999 | Tsai ........................... 369/219 |
| 6,005,836 A | * | 12/1999 | Choi ........................... 369/219 |

FOREIGN PATENT DOCUMENTS

| EP | 0 290 979 | * | 11/1988 |
| EP | 0 821 352 | * | 1/1998 |
| JP | 61-104335 | * | 5/1986 |
| JP | 62-226481 |   | 10/1987 |
| JP | 01-146136 | * | 6/1989 |
| JP | 02-214024 | * | 8/1990 |
| JP | 04-328333 | * | 11/1992 |
| JP | 5-50524 |   | 2/1993 |
| JP | 05-303749 | * | 11/1993 |
| JP | 06-168455 | * | 6/1994 |
| JP | 07-320275 | * | 12/1995 |
| JP | 08-249805 | * | 9/1996 |
| JP | 8-7315 |   | 12/1996 |
| JP | 09-161277 | * | 6/1997 |
| JP | 09-223353 | * | 8/1997 |
| JP | 09-306116 | * | 11/1997 |
| JP | 10-112122 | * | 4/1998 |
| JP | 10-143870 | * | 5/1998 |
| JP | 10-162372 | * | 6/1998 |
| WO | 84/04991 | * | 12/1984 |

* cited by examiner

Primary Examiner—William Klimowicz
(74) Attorney, Agent, or Firm—Anderson Kill & Olick; Eugene Lieberstein; Michael Meller

(57) ABSTRACT

A pickup adjusting mechanism is provided with a turntable on which a disk-shaped recording medium is clamped, a disk motor which drives the turntable, a first base which supports the disk motor, a pickup which reads information recorded on the disk-shaped recording medium, a second base which is supported on the first base and movably supports the pickup, and an angle adjusting part which is provided between the first base and the second base, and adjusts an angle of the pickup with respect to the disk-shaped recording medium clamped on the turntable.

15 Claims, 24 Drawing Sheets

PRIOR ART

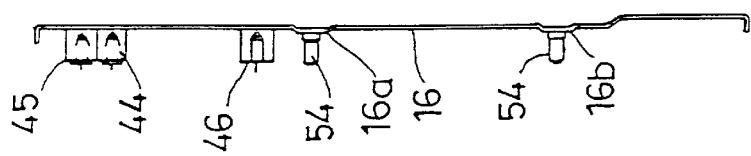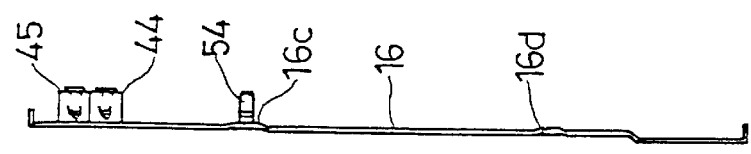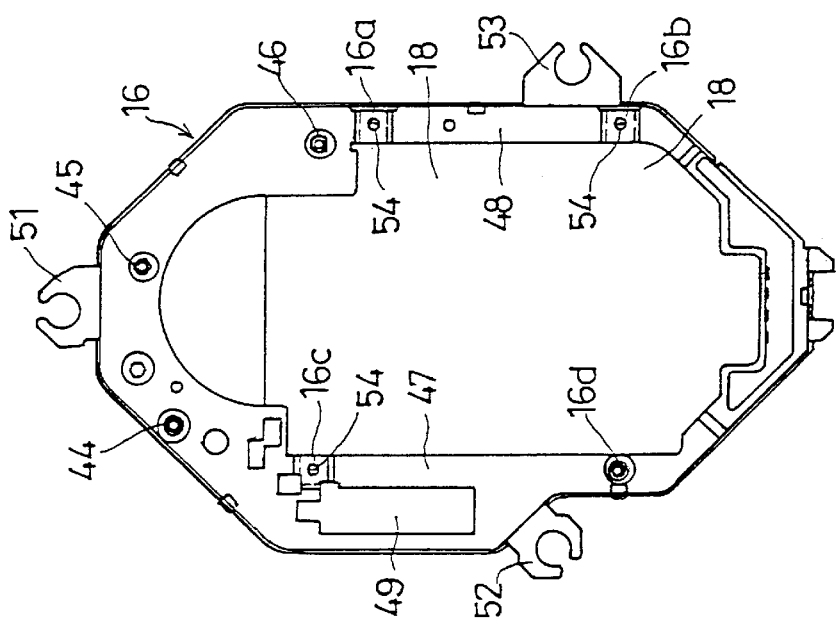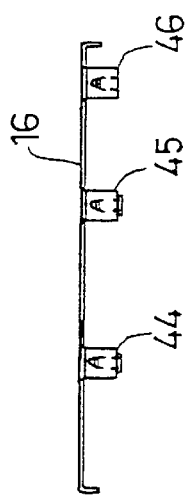

FIG. 14
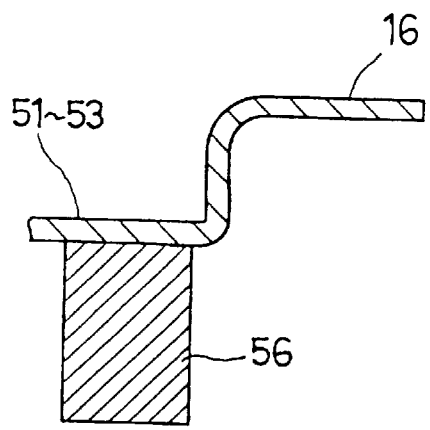
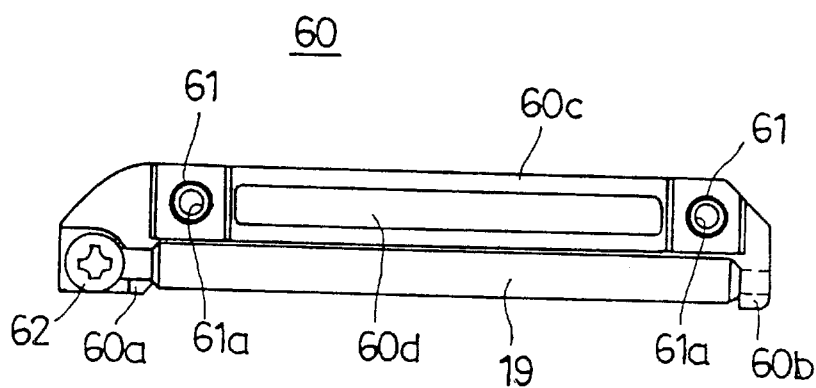
FIG. 15A
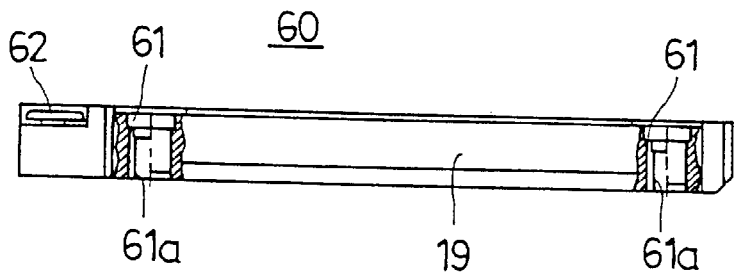
FIG. 15B

FIG. 25
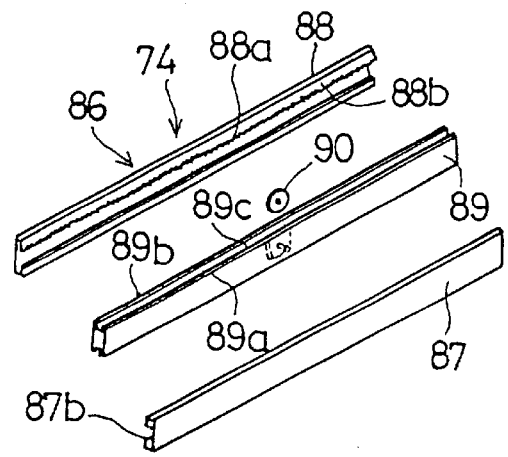
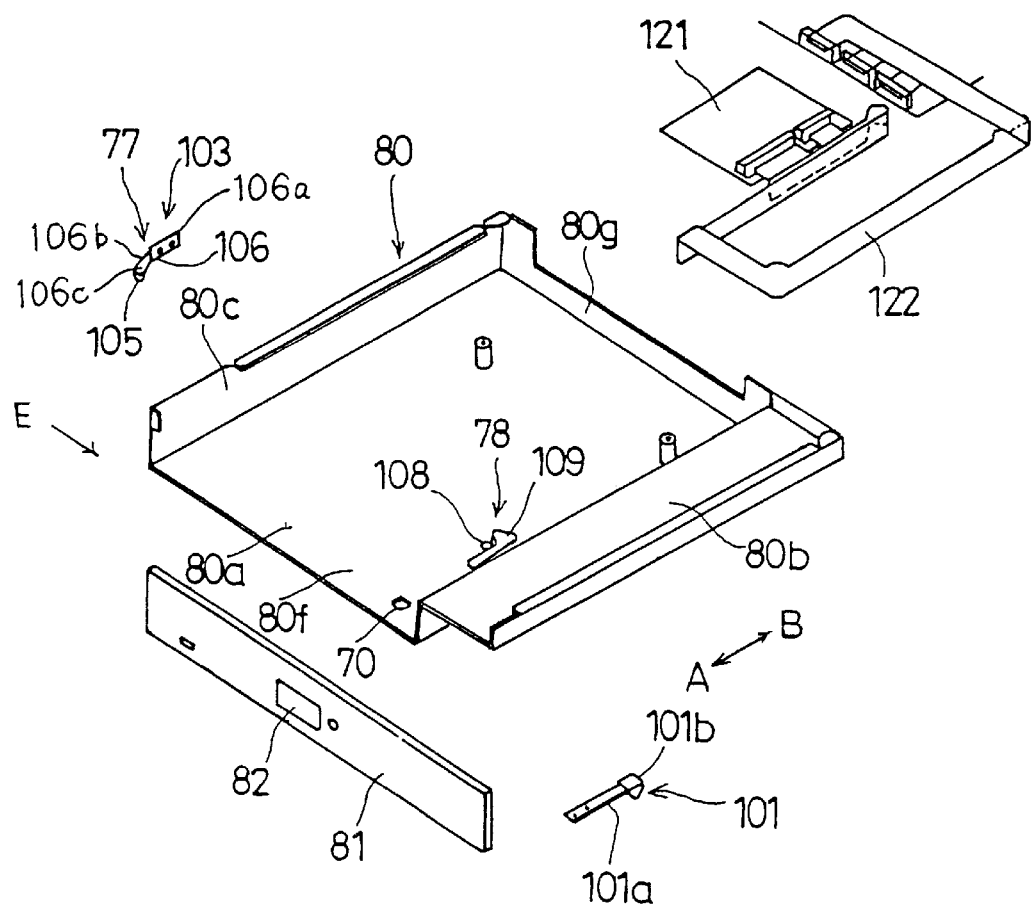

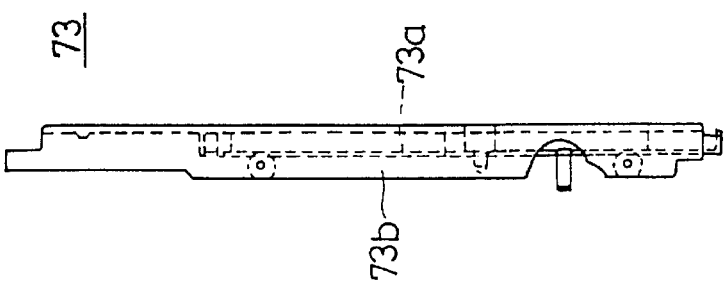
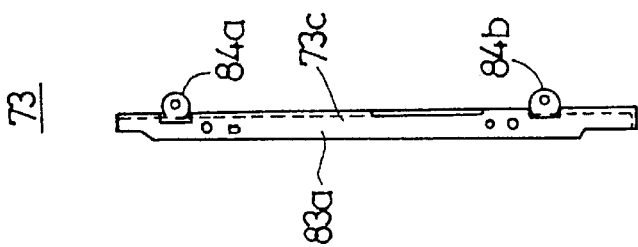
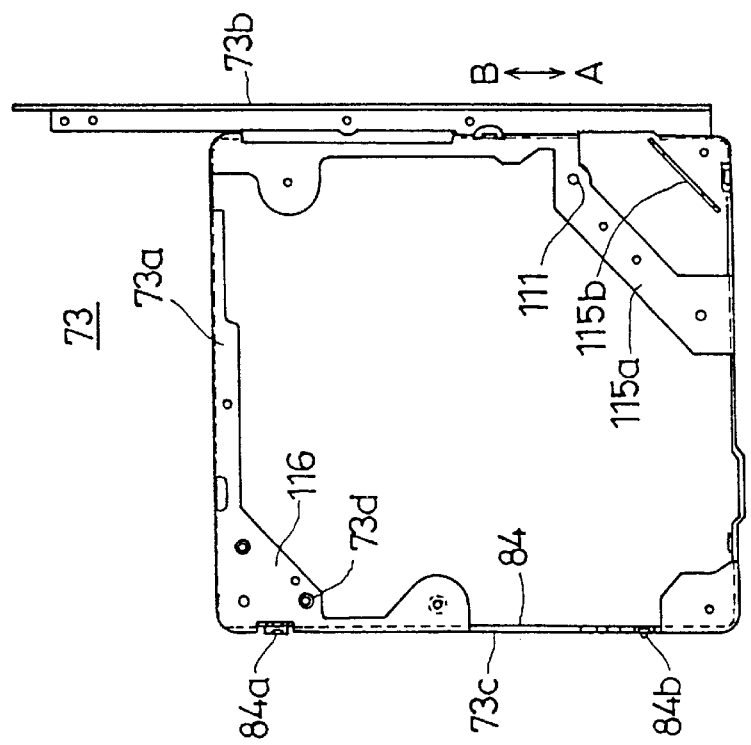
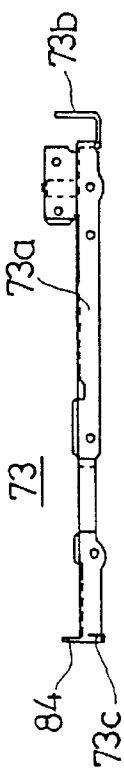

PICKUP ADJUSTING MECHANISM

BACKGROUND OF THE INVENTION

The present invention generally relates to pickup adjusting mechanisms, and more particularly to a pickup adjusting mechanism which is designed to adjust a relative angle between a pickup and a disk-shaped recording medium which is clamped on a turntable.

For example, a disk-shaped recording medium is used as a recording medium capable of storing information such as a database and a software, and the information is reproduced from the disk-shaped recording medium by a laser pickup of an optical disk unit. When the disk-shaped recording medium is placed on a tray and is inserted into the disk unit, the disk-shaped recording medium within the tray is clamped on a turntable. Then, the pickup is guided by guide shafts along a radial direction of the disk-shaped recording medium, and carries out a seek operation.

In this type of a disk unit which is loaded with the disk-shaped recording medium, a relative angle between the pickup and the disk-shaped recording medium must be adjusted so that a distance between a seek operation position of the pickup and the disk-shaped recording medium loaded on the turntable becomes constant, in order to accurately read the information recorded on (that is, pit pattern formed on) the disk-shaped recording medium with a high density.

In other words, in an assembly line of the disk unit, after the turntable, the pickup and the like are assembled, a reflected light from a reference disk which is used for the positional adjustment is detected by the pickup in a state where the reference disk is clamped on the turntable. In this state, the mounting angle of the turntable is adjusted while measuring an angular error of the reflected light from the reference disk detected by the. pickup by a measuring unit (automatic collimator), so that the angle of the reflected light from the reference disk becomes a prescribed value.

A description will be given of a conventional turntable adjusting mechanism applied to the disk unit.

FIG. 1 is a cross sectional view for explaining an important part of the conventional turntable adjusting mechanism.

As shown in FIG. 1, in a conventional turntable adjusting mechanism 1, a motor base 4 for supporting a disk motor 3 which rotates a turntable 2 has a disk-shape, and the position of this motor base 4 is adjusted. The motor base 4 is supported in a state contacting sloping surfaces 6a of base support parts 6 which project from a fixed base 5 which is provided below the motor base 4.

In addition, an eccentric pin 7 for adjusting the angle projects from the fixed base 5. An engaging part 7a provided at the tip end of the eccentric pin 7 penetrates an engaging hole 4a in the motor base 4. Because the outer periphery of the motor base 4 contacts the sloping surfaces of the base support parts 6, when the motor base 4 moves in a horizontal direction, the peripheral edge part in the moving direction is displaced upwards while the peripheral edge part in the opposite direction is displaced downwards.

For this reason, it is possible to simultaneously adjust the inclination angle and the inclination direction of the fixed base 5 by changing the position of the engaging part 7a of the eccentric pin 7 which penetrates the engaging hole 4a in the motor base 4. When making the angle adjustment in a state where a reference disk 8 is clamped on the turntable 2, the mounting angle of the turntable 2 is adjusted while measuring the angular error of the reflected light from the reference disk 8 detected by a pickup (not shown) so that the angle of the reflected light becomes a prescribed value.

However, the conventional turntable adjusting mechanism 1 is constructed to incline the turntable 2 together with the motor base 4. In addition, a clearance along a direction of the height of a tray (not shown) and the turntable 2 is small because of the demands to reduce the thickness of the disk unit. As a result, when the turntable 2 is inclined, there is a problem in that the peripheral edge part of the reference disk 8 which is clamped on the turntable 2 contacts the tray.

On the other hand, it is conceivable to adjust the direction of the guide shafts of the pickup instead of adjusting the position of the turntable 2. But in this conceivable case, it would be necessary to adjust the pair of guide shafts on both sides of the pickup to assume identical angles, and the adjusting operation would become extremely troublesome to carry out.

SUMMARY OF THE INVENTION

Accordingly, it is a general object of the present invention to provide a novel and useful pickup adjusting mechanism in which the problems described above are eliminated.

Another and more specific object of the present invention is to provide a pickup adjusting mechanism comprising a turntable on which a disk-shaped recording medium is clamped, a disk motor which drives the turntable, a first base which supports the disk motor, a pickup which reads information recorded on the disk-shaped recording medium, a second base which is supported on the first base and movably supports the pickup, and an angle adjusting part which is provided between the first base and the second base, and adjusts an angle of the pickup with respect to the disk-shaped recording medium clamped on the turntable. According to the pickup adjusting mechanism of the present invention, it is possible to simply adjust, within a short time, the angle of the pickup with respect to the disk-shaped recording medium for the entire second base which is independent of the first base. For this reason, the disk-shaped recording medium will not tilt as in the conventional case, and it is possible to prevent the peripheral edge part of the disk-shaped recording medium from contacting a tray or the like, and to prevent an excessively troublesome and time-consuming adjusting operation.

Still another object of the present invention is to provide a pickup adjusting mechanism, wherein the second base is supported at four positions with respect to the first base, and the angle adjusting part is provided to make an adjustment at three of the four positions. According to the pickup adjusting mechanism of the present invention, it is possible to simply adjust the position of the second base with respect to the first base with a high precision.

A further object of the present invention is to provide a pickup adjusting mechanism, wherein the angle adjusting part includes an adjusting screw which adjusts a gap between the second base and the first base. According to the pickup. adjusting mechanism of the present invention, it is possible to accurately adjust the position of the second base with respect to the first base by simply turning the adjusting screw.

Another object of the present invention is to provide a pickup adjusting mechanism, wherein the second base comprises a guide shaft base which supports a guide shaft guiding a movement of the pickup, and a lead screw base which supports a lead screw driving the pickup. According to the pickup adjusting mechanism of the present invention, it is possible to independently adjust the mounting positions of the guide shaft and the lead screw which movably support the pickup.

Still another object of the present invention is to provide a pickup adjusting mechanism for adjusting a mounting angle of a pickup with respect to a disk-shaped recording medium which is placed on a turntable driven by a disk motor, comprising a first base which supports the disk motor, a second base which is supported on the first base and movably supports the pickup, and an angle adjusting part which is provided between the first base and the second base, and adjusts the mounting angle of the pickup by adjusting a gap between the first base and the second base. According to the pickup adjusting mechanism of the present invention, it is possible to simply adjust, within a short time, the angle of the pickup with respect to the disk-shaped recording medium for the entire second base which is independent of the first base. For this reason, the disk-shaped recording medium will not tilt as in the conventional case, and it is possible to prevent the peripheral edge part of the disk-shaped recording medium from contacting a tray or the like, and to prevent an excessively troublesome and time-consuming adjusting operation.

The angle adjusting part may include an adjusting screw which adjusts the gap between the first base and the second base. In addition, the adjusting screw may penetrate the first base and the second base, and may be adjustable from the first base and the second base. According to the pickup adjusting mechanism of the present invention, it is possible to accurately and simply adjust the mounting position of the pickup within a short time.

A further object of the present invention is to provide a disk unit comprising a turntable on which a loaded disk-shaped recording medium is clamped, a disk motor which drives the turntable, a first base which supports the disk motor, a pickup which at least reads information from the disk-shaped recording medium, a second base which is supported on the first base and movably supports the pickup, and an angle adjusting part which is provided between the first base and the second base, and adjusts an angle of the pickup with respect to the disk-shaped recording medium. According to the disk unit of the present invention, it is possible to simply adjust, within a short time, the angle of the pickup with respect to the disk-shaped recording medium for the entire second base which is independent of the first base. For this reason, the disk-shaped recording medium will not tilt as in the conventional case, and it is possible to prevent the peripheral edge part of the disk-shaped recording medium from contacting a part of the disk unit during the adjustment, and to prevent an excessively troublesome and time-consuming adjusting operation.

The second base may be supported at four positions with respect to the first base, and the angle adjusting part may be provided to make an adjustment at three of the four positions. Moreover, the angle adjusting part may include an adjusting screw which adjusts a gap between the second base and the first base. This adjusting screw may penetrate the first base and the second base, and may be adjustable from the first base and the second base. In these cases, it is possible to accurately and simply adjust the mounting position of the pickup within a short time.

Another object of the present invention is to provide a pickup adjusting mechanism for adjusting a pickup, comprising a disk motor, and a base which supports the disk motor and the pickup, wherein the pickup is supported at four points, and the pickup is fixed at one of the four points and a height position of the pickup is adjustable at remaining three points. According to the pickup adjusting mechanism of the present invention, it is possible to simply adjust, with a high precision and within a short time, the mounting angle of the pickup with respect to the base. It is of course possible to provide this pickup adjusting mechanism in a disk unit.

Other objects and further features of the present invention will be apparent from the following detailed description when read in conjunction with the accompanying drawings.

BRIEF DESCRIPTION OF THE DRAWINGS

FIGS. 8A through 8D respectively are diagrams for explaining the construction of the movable base;

FIG. 14 is a cross sectional view showing fixing parts;

FIGS. 15A and 15B respectively are diagrams showing a guide shaft base to be mounted on a guide shaft mounting part of the movable base;

FIG. 25 is a bottom half of a disassembled perspective view showing the CD-ROM drive unit;

FIGS. 27A through 27D respectively are diagrams showing a sub chassis;

DESCRIPTION OF THE PREFERRED EMBODIMENTS

Figure 1:
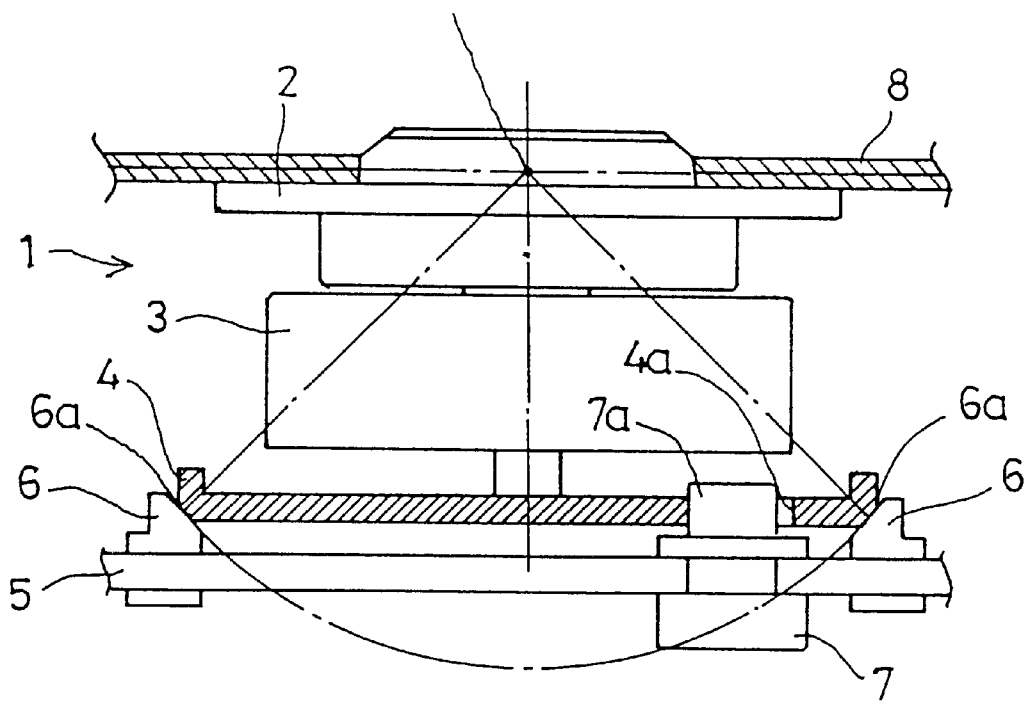
FIG. 1 is a cross sectional view for explaining an important part of the conventional turntable adjusting mechanism.
Figure 2:
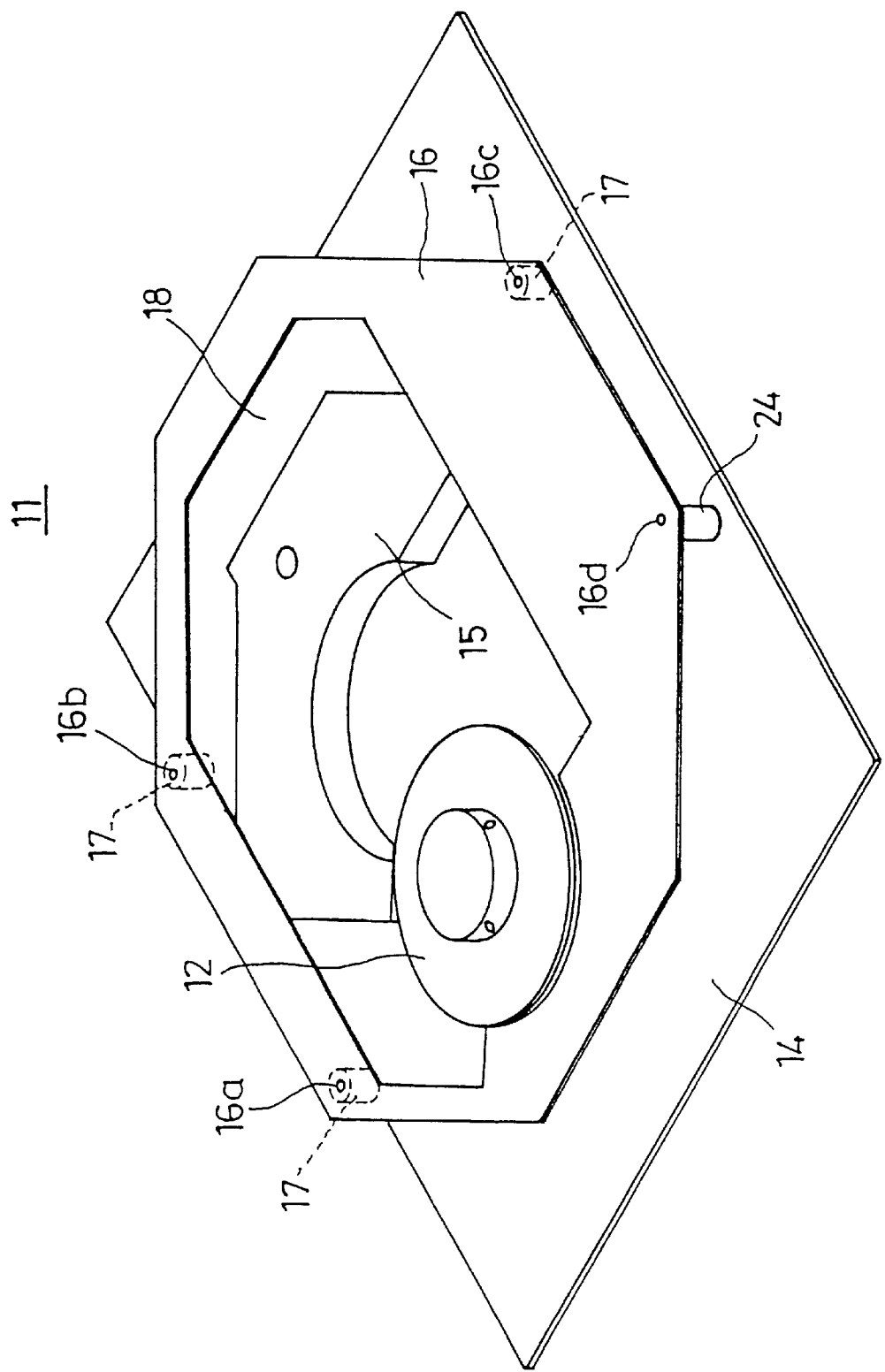
FIG. 2 is a perspective view showing an embodiment of a pickup adjusting mechanism according to the present invention.
Figure 3:
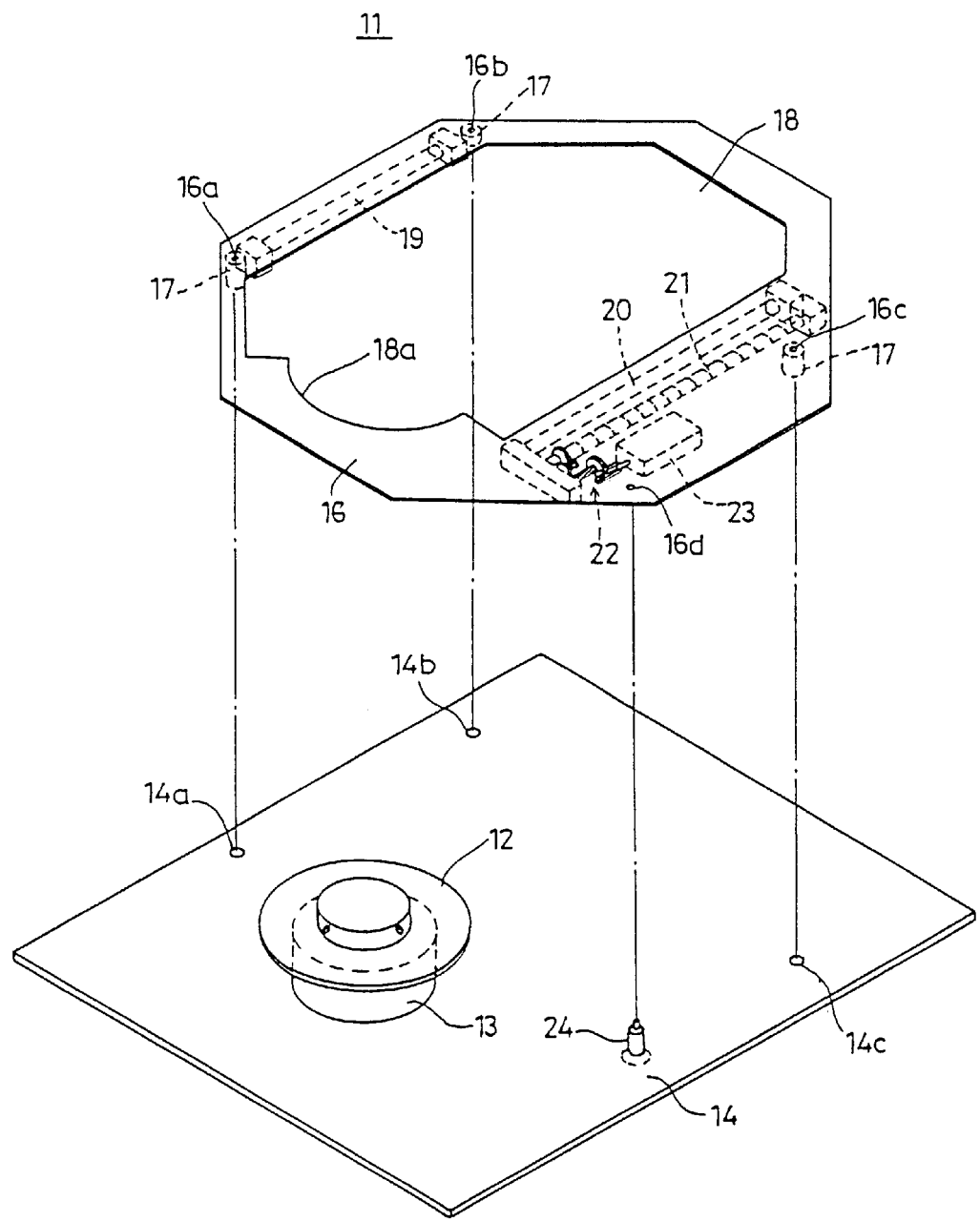
FIG. 3 is a disassembled perspective view showing the embodiment of the pickup adjusting mechanism.

FIG. 2 is a perspective view showing an embodiment of a pickup adjusting mechanism according to the present invention. FIG. 3 is a disassembled perspective view showing the embodiment of the pickup adjusting mechanism.

As shown in FIGS. 2 and 3, a pickup adjusting mechanism 11 is assembled in a disk unit which is loaded with a disk-shaped recording medium such as a CD-ROM, PD disk cartridge and DVD disk cartridge.

The pickup adjusting mechanism 11 generally includes a turntable 12 on which a disk-shaped recording medium (not shown) is clamped, a disk motor which drives the turntable 12, a fixed base (first base) 14 which supports the disk motor 13, a pickup 15 which reads information stored on the disk-shaped recording medium, a movable base (second base) 16 which is supported on the fixed base 14 and movably supports the pickup 15, and an angle adjusting part 17 which is provided between the fixed base 14 and the movable base 16 and adjusts an angle of the pickup 15 with respect to the disk-shaped recording medium which is clamped on the turntable 12.

The disk motor 13 is mounted on the fixed base 14. In addition, mounting holes 14a through 14c are provided in the fixed base 14 at 3 positions where the angle adjusting part 17 is mounted. The mounting holes 14a through 14c are provided at positions in the periphery of the disk motor 13 at approximately the same intervals.

The movable base 16 has a frame shape within an opening 18 corresponding to a range in which the pickup 15 moves. A retreat part 18a corresponding to a contour shape of the turntable 12 is formed in the opening 18, so that a peripheral edge part of the opening 18 does not contact the turntable 12 when the mounting angle of the movable base 16 is adjusted. In addition, a guide shaft 19 which guides the movement of the pickup 15 is supported on the left side of the opening 18.

A guide shaft 20 which guides the movement of the pickup 15 and a lead screw 21 are supported on the right side of the opening 18 so as to extend in the same direction. In addition, a gear mechanism 22 and a pickup driving motor 23 are mounted on the right side of the opening 18. The lead screw 21 drives the pickup 15 in a guiding direction of the guide shafts 19 and 20 when a rotational driving force of the pickup driving motor 23 is transmitted to the lead screw 21 via the gear mechanism 22.

Figure 4:
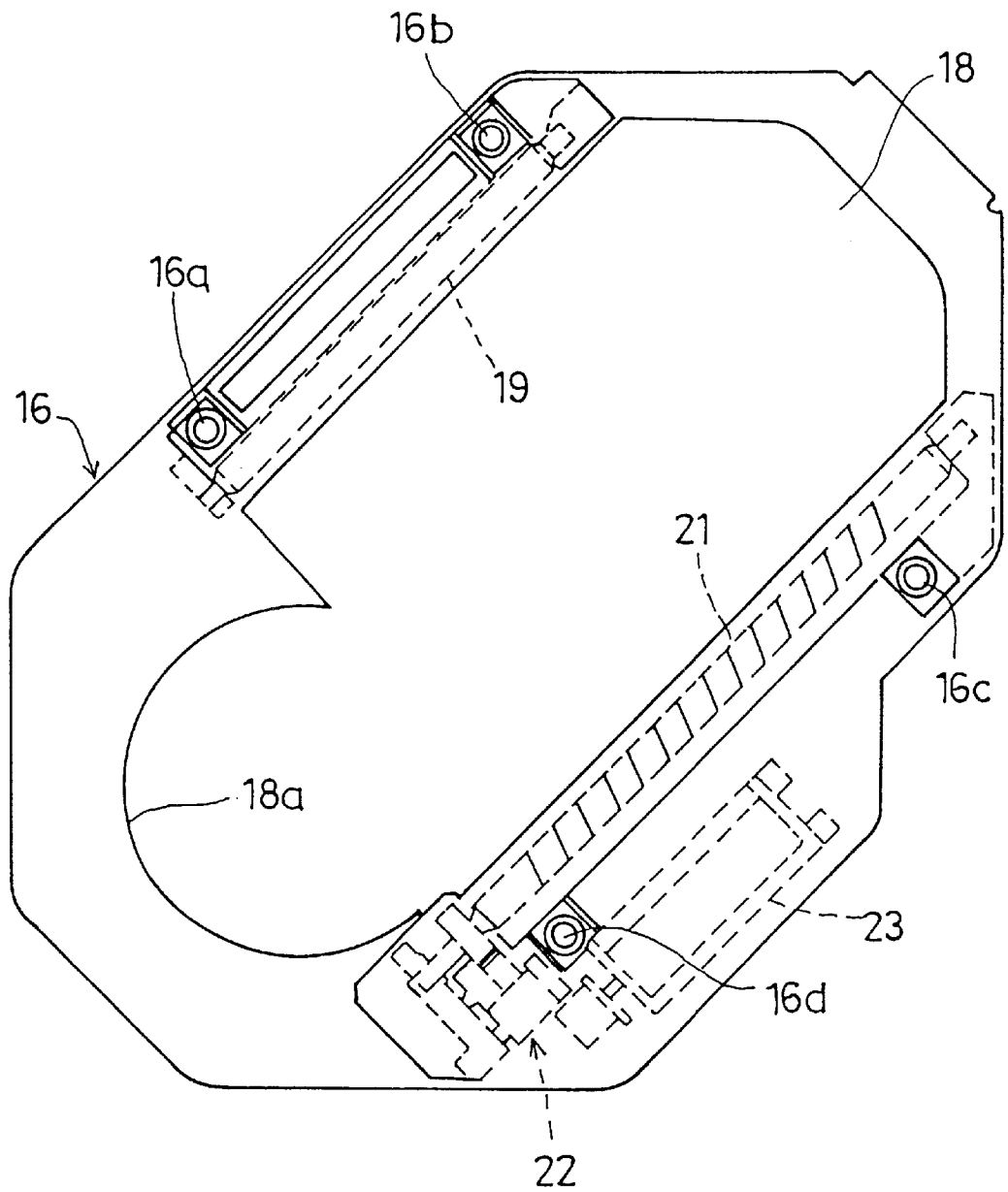
FIG. 4 is a plan view showing a movable base.

FIG. 4 is a plan view showing the movable base 16. In FIG. 4, the illustration of the guide shaft 20 is omitted.

As shown in FIG. 4, mounting holes 16a and 16b used for mounting the angle adjusting part 17 are provided in the vicinity of both sides of the guide shaft 19, and a mounting hole 16c used for mounting the angle adjusting part 17 is also provided in the vicinity of one end of the lead screw 21. A screw hole 16d is provided in the vicinity of the other end of the lead screw 21, and a stepped fixing screw 24 is screwed into this screw hole 16d. Accordingly, the movable base 16 is supported at 4 points, namely, at the positions of the mounting holes 16a through 16c where the angle adjusting part 17 is mounted and the fixing screw 24 described above.

Figure 5:
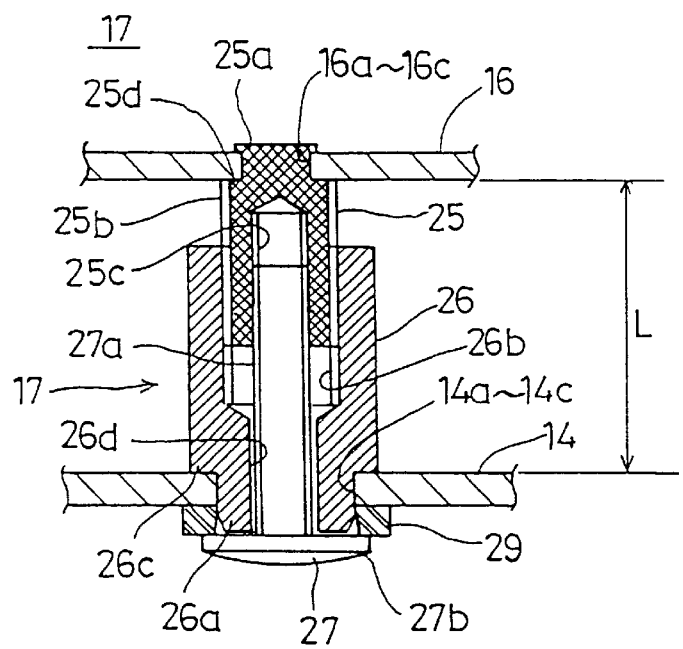
FIG. 5 is a cross sectional view showing the construction of an angle adjusting part.

FIG. 5 is a cross sectional view showing the construction of the angle adjusting part 17.

As shown in FIG. 5, the angle adjusting part 17 includes a first stud screw 25 which is fixedly fitted into each of the mounting holes 16a through 16c of the movable base 16, a second stud screw 26 which is fixedly fitted into each of the mounting holes 14a through 14c of the fixed base 14, and a lock screw 27 which fixes the second stud screw 26 on the fixed base 14.

The first stud screw 25 is prevented from slipping in an axial direction by calking an upper end 25a in a state where the upper end 25a is fitted into a corresponding one of the mounting holes 16a through 16c in the movable base 16. An external thread 25b is formed on the outer periphery of the first stud screw 25, and an internal thread 25c is formed at the center of the first stud screw 25. The internal thread 25c has an opening at the lower end side of the first stud screw 25. In addition, the outer diameter of the first stud screw 25 is greater than the hole diameter of the mounting holes 16a through 16c, and a stepped part 25d of the first stud screw 25 contacts the lower surface of the movable base 16.

The second stud screw (adjusting screw) 25 is prevented from slipping in an axial direction by calking an lower end 26a in a state where the lower end 26a is fitted into a corresponding one of the mounting holes 14a through 14c in the fixed base 14. An internal thread 26b is formed at the center of the second stud screw 26. The internal thread 26b has an opening at the upper end side of the second stud screw 26, and the external thread 25b of the first stud screw 25 is screwed into this internal thread 26b. In addition, the outer diameter of the second stud screw 26 is greater than the hole diameter of the mounting holes 14a through 14c, and a stepped part 26c of the second stud screw 26 contacts the upper surface of the fixed base 14.

Furthermore, the internal thread 26a communicates with a penetration hole 26d which opens to the lower end side of the second stud screw 26. An external thread 2a of the lock screw 27 is inserted into the penetration hole 26d. In addition, 2 parallel faces (not shown) are cut and formed on the outer periphery of the second stud screw 26, as an engaging part to be engaged by a tool such as a spanner, so that the second stud screw 26 can be turned by the tool.

The lock screw 27 is tightened by screwing the external thread 27a into the internal thread 25c of the first stud screw 25 after the positional adjustment. A washer 29 is interposed between a head part 27b of the lock screw 27 and the fixed base 14. Hence, a pressing force acts on the washer 29 when the lock screw 27 is tightened, and the second stud screw 26 is fixed on the fixed base 14.

Next, a description will be given of an adjusting operation of the angle adjusting part 17 having the above described construction.

The angle adjusting part 17 is interposed between the fixed base 14 and the movable base 16, and a gap L between the fixed base 14 and the movable base 16 is adjustable. When adjusting this gap L, the second stud screw 26 is turned clockwise or counterclockwise in a state where the lock screw 27 is loosened. When carrying out the adjusting operation of the angle adjusting part 17, one of the 4 points providing the support between the fixed base 14 and the movable base 16 is fixed by the fixing screw 24, and the gap L at the other 3 points is adjusted by the angle adjusting part 17.

For example, when the second stud screw 26 is turned clockwise, the first stud screw 25 and the second stud screw 26 are displaced so as to mutually extend in the axial direction. As a result, the stepped part 25d of the first stud screw 25 pushes the movable base 16 upwards, thereby increasing the gap L.

On the other hand, when the second stud screw 26 is turned counterclockwise, the first stud screw 25 and the second stud screw 26 are displaced so as to mutually contract in the axial direction. Consequently, the stepped part 25d of the first stud screw 25 is displaced downwards to let the movable base 16 move downwards, thereby reducing the gap L.

By adjusting the height position of the angle adjusting part 17 at the 3 points as described above, it is possible to adjust the mounting angle of the movable base 16 with respect to the fixed base 14, that is, to adjust the angle of the pickup 15 supported on the movable base 16. Accordingly, a reflected light from a reference disk which is used for the positional adjustment is detected by the pickup 15 in a state where the reference disk is clamped on the turntable 12. In this state, the mounting angle of the pickup 15 is adjusted while measuring an angular error of the reflected light from the reference disk detected by the pickup 15 by a measuring unit (automatic collimator), so that the angle of the reflected light from the reference disk becomes a prescribed value.

After the angle of an optical axis of the pickup 15 is adjusted by the height position adjustment of the angle adjusting part 17 carried out at the 3 points (or locations), the lock screw 27 locks the angle adjusting part 17 so as to lock the fixing base 14 and the movable base 16 with respect to each other.

Therefore, it is possible to simply adjust the angle of the optical axis of the pickup 15 by turning the second stud screw 26 in the peripheral direction, and the adjusting operation can be carried out in a short time. In addition, because the mounting angle of the movable base 16 with respect to the fixed base 14 is adjusted by the height position adjustment of the angle adjusting part 17 at the 3 locations described above and the angle of the pickup 15 is adjusted to an appropriate state, the mounting angle of the turntable 12 mounted on the fixed base 14 will not change, and the reference disk clamped on the turntable 12 will not contact the tray (not shown).

Figure 6:
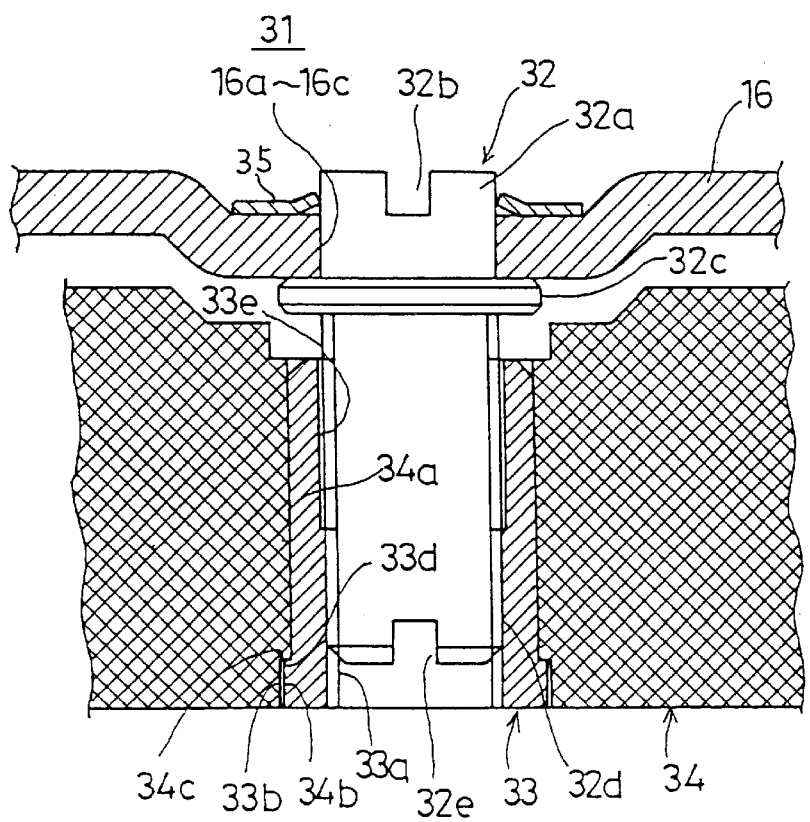
FIG. 6 is a cross sectional view showing the construction of a modification of the angle adjusting part.

FIG. 6 is a cross sectional view showing the construction of a modification of the angle adjusting part.

As shown in FIG. 6, an angle adjusting part 31 includes a stud screw 32 fitted into each of the mounting holes 16a through 16c in the movable base 16 in a freely rotatable manner, a nut screw 33 into which the stud screw 32 is screwed, and a holder screw 34 into which the nut screw 33 is screwed.

The stud screw 32 has a head part 32a which penetrates a corresponding one of the mounting holes 16a through 16c in the movable base 16, and a driver groove 32b formed in the head part 32a. The driver groove 32b can be engaged from above by a tool, such as a minus-type driver, and turned in the peripheral direction of the stud screw 32. In addition, a guard ring 35 prevents the head part 32a of the stud screw 32 from falling downwards.

A flange part 32c having a diameter greater than the diameter of a corresponding one of the mounting holes 16a through 16c is provided on the outer periphery of the stud screw 32. This flange part 32c contacts the lower surface of the movable base 16, and prevents the stud screw 32 from slipping upwards. In addition, an external thread 32d which extends downwards from the flange part 32c is formed on the outer periphery of the stud screw 32. A driver groove 32e is formed in the lower end of the stud screw 32. In other words, the stud screw 32 can be turned by the driver groove 32b at the upper end or the driver groove 32e at the lower end, whichever is easier to turn.

An internal thread 33a is provided on the inner peripheral side of the nut screw 33, and the external thread 32d of the stud screw 32 is screwed into this internal thread 33a. Furthermore, an external thread 33b and a stepped part 33d are provided on the outer peripheral side of the nut screw 33. The stepped part 33d restricts the screw-in position of the external thread 33b. The internal thread 33a is provided on the lower half of the nut screw 33, and a penetration hole 33e which has a diameter greater than the diameter of the internal thread 33a is provided above the internal thread 33a.

The holder screw 34 is fixed on the fixed base 14, and the nut screw 33 is screwed into a screw hole 34a which penetrates the holder screw 34 in the axial direction thereof. An internal thread 34b and a stopper 34c are formed at this screw hole 34a. The external thread 33b of the nut screw 33 is screwed into the internal thread 34b, and the stepped part 33d of the nut screw 33 contacts the stopper 34c.

The nut screw 33 is fixed to the holder screw 34 in a state where the external thread 33b is screwed into the screw hole 34a until the stepped part 33d contacts the stopper 34c. The holder screw 34 may be provided as the fixed base 14.

Next, a description will be given of the adjusting operation of the angle adjusting part 31 having the above described construction.

Similarly as in the case of the angle adjusting part 17 described above, the angle adjusting part 31 is interposed between the fixed base 14 and the movable base 16, and a gap L between the fixed base 14 and the movable base 16 is adjustable. When adjusting this gap L, a tool, such as the minus-type driver, is inserted into the driver groove 32b at the upper end or the driver groove 32e at the lower end of the stud screw 32 and turned clockwise or counterclockwise.

For example, when the stud screw 32 is turned clockwise, the stud screw 32 and the nut screw 33 are displaced in so as to mutually extend in the axial direction. As a result, the flange part 32c of the stud screw 32 pushes the movable base 16 upwards, thereby increasing the gap L.

On the other hand, when the stud screw 32 is turned counterclockwise, the stud screw 32 and the nut screw 33 are displaced so as to mutually contract in the axial direction. Consequently, the flange part 32c of the stud screw 32 is displaced downwards to let the movable base 16 move downwards, thereby reducing the gap L.

By adjusting the height position of the angle adjusting part 31 at 3 points as described above, it is possible to adjust the mounting angle of the movable base 16 with respect to the fixed base 14, that is, to adjust the angle of the pickup 15 supported on the movable base 16. Accordingly, a reflected light from the reference disk which is used for the positional adjustment is detected by the pickup 15 in a state where the reference disk is clamped on the turntable 12. In this state, the mounting angle of the pickup 15 is adjusted while measuring an angular error of the reflected light from the reference disk detected by the pickup 15 by a measuring unit (automatic collimator), so that the angle of the reflected light from the reference disk becomes a prescribed value.

Since the stud screw 32 can be turned from either the driver groove 32b at the upper end or the driver groove 32e at the lower end, it is possible to simply adjust the angle of the optical axis of the pickup 15 by turning the stud screw 32 in the peripheral direction, and the adjusting operation can be carried out in a short time. In addition, because the mounting angle of the movable base 16 with respect to the fixed base 14 is adjusted by the height position adjustment of the angle adjusting part 31 at the 3 locations described above and the angle of the pickup 15 is adjusted to an appropriate state, the mounting angle of the turntable 12 mounted on the fixed base 14 will not change, and the reference disk clamped on the turntable 12 will not contact the tray (not shown).

In the embodiment described above, the angle adjusting parts 17 and 31 having the screw structure are provided at 3 locations. However, it is of course possible to provide an angle adjusting part having a different structure between the fixed base 14 and the movable base 16.

Next, a description will be given of a modification of the pickup adjusting mechanism.

Figure 7:
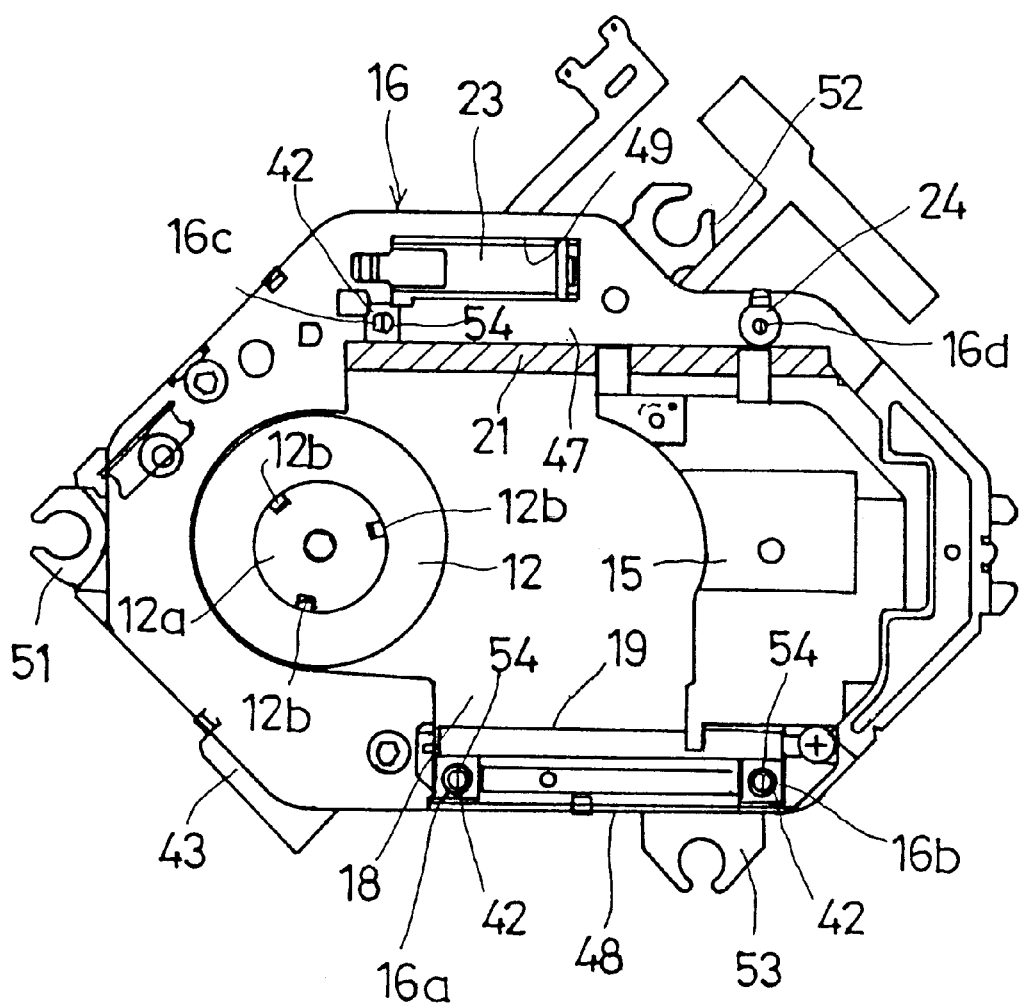
FIG. 7 is a plan view showing the construction of a modification of the pickup adjusting mechanism.

FIG. 7 is a plan view showing the construction of this modification of the pickup adjusting mechanism. In FIG. 7, those parts which are the same as those corresponding parts in FIGS. 2 through 6 are designated by the same reference numerals, and a description thereof will be omitted.

As shown in FIG. 7, a pickup adjusting mechanism 41 includes the turntable 12, the disk motor 13, the fixed base 14, the pickup 15, the movable base 16, and an angle adjusting part 42 which adjusts the angle of the pickup 15 with respect to the reference disk and is provided at 3 locations. A projecting clamp part 12a is provided at the center of the turntable 12, and a part of an engaging ball 12b which engages the inner periphery of the reference disk (or disk-shaped recording medium) projects from the outer periphery of the clamp part 12a. The engaging ball 12b is arranged at 120 degree intervals.

Each of 3 engaging balls 12b is urged outwards by a coil spring (not shown) which is inserted inside the clamp part 12a, and is movable in the radial direction of the turntable 12, that is, the reference disk. For this reason, when the inner periphery of the reference disk engages the clamp 12a, each engaging ball 12b provided in the clamp part 12a pushes against the inner periphery of the reference disk to clamp the reference disk.

In addition, a motor base 43 is provided on the lower surface side of the movable base 16. This motor base 43 supports the driving motor 13 which drives the turntable 12.

FIGS. 8A, 8B, 8C and 8D respectively are a bottom view of the movable base 16, a side view of the movable base 16 viewed from the left in FIG. 8A, a side view of the movable base 16 viewed from the right in FIG. 8A, and a rear view of the movable base 16 viewed from the top in FIG. 8A. In the side views shown in FIGS. 8B and 8C and the rear view shown in FIG. 8D, the illustration of a wall part surrounding the outer periphery of the movable base 16 is omitted for the sake of convenience.

As shown in FIGS. 8A through 8D, support parts 44 through 46 for supporting the motor base 43 are provided on the movable base 16. An internal thread is provided inside each of the support parts 44 through 46, and the motor base 43 is fixed by screwing fixing screws into the internal threads of the support parts 44 through 46. The opening 18 for enabling movement of the pickup 15 is provided in the movable base 16, and a lead screw mounting part 47 is provided on one side of the opening 18. This lead screw mounting part 47 supports the lead screw 21, the gear mechanism 22 and the pickup driving motor 23. A guide shaft mounting part 48 for supporting the guide shaft 19 is provided on the other side of the opening 18.

A mounting hole 49 is provided in a vicinity of the lead screw mounting part 47. This mounting hole 49 is used to mount the pickup driving motor 23 which drives the lead screw 21.

The mounting holes 16a and 16b are provided in the movable base 16 in the vicinities of both ends of the guide shaft mounting part 48. The mounting hole 16c is provided in the movable base 16 in the vicinity of one end of the lead screw mounting part 47. The mounting holes 16a through 16c are respectively used to mount the angle adjusting part 42.

In addition, the screw hole 16d is provided in the movable 16 on the other end of the lead screw mounting part 47. The stepped fixing screw 24 is screwed into this screw hole 16d. Hence, the pickup 15 is supported at 4 points, that is, by the angle adjusting parts 42 mounted at the 3 positions of the mounting holes 16a through 16c and the fixing screw 24.

An adjusting screw 54 of the angle adjusting part 42 rotatably engages a corresponding one of the mounting holes 16a through 16c. Fixing parts 51 through 53 which are fixed on a sub chassis which will be described later are provided on the movable base 16.

Figure 9:
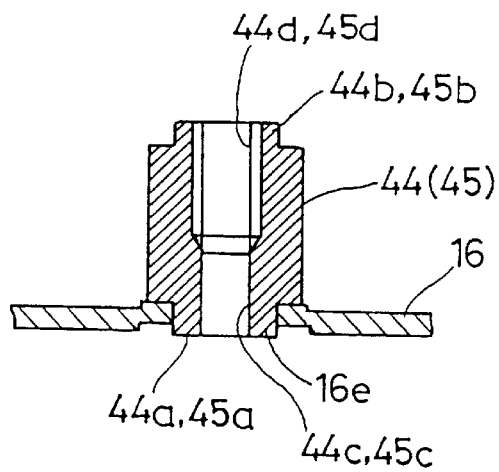
FIG. 9 is a cross sectional view showing a mounted state of support parts.

FIG. 9 is a cross sectional view showing the mounting state of the support parts 44 and 45.

As shown in FIG. 9, the support parts 44 and 45 respectively include press-fitting parts 44a and 45a which are provided on one end thereof and are press-fit into mounting holes 16e in the movable base 16, and projecting parts 44b and 45b which are provided on the other end thereof and fit into mounting holes (not shown) in the motor base 43. Internal threads 44d and 45d are provided within axial holes 44c and 45c which respectively penetrate the support parts 44 and 45 in the axial direction. Accordingly, the support parts 44 and 45 support the motor base 43, and also function as fixing nuts.

Figure 10:
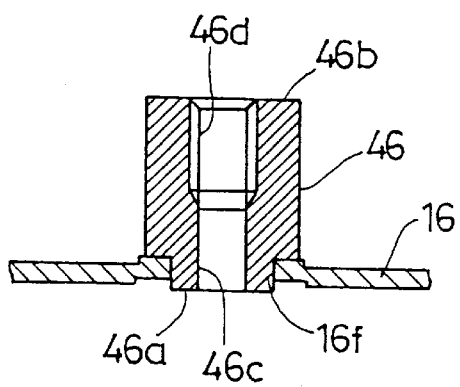
FIG. 10 is a cross sectional view showing a mounted state of a support part.

FIG. 10 is a cross sectional view showing the mounting state of the support part 46.

As shown in FIG. 10, the support part 46 includes a press-fitting part 46a which is provided on one end thereof and is press-fit into a mounting hole 16f in the movable base 16, and an end part 46b which is provided on the other end thereof and contacts a mounting surface (not shown) of the motor base 43. An internal thread 46d is provided within an axial hole 46c which penetrates the support part 46 in the axial direction. Thus, the support part 46 supports the motor base 43, and also functions as a fixing nut.

Figure 11:
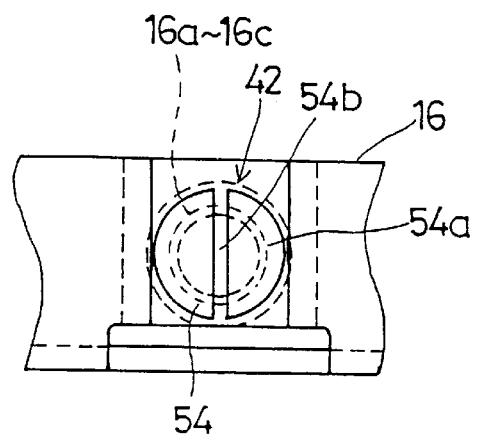
FIG. 11 is a plan view showing the angle adjusting part.

FIG. 11 is a plan view showing the angle adjusting part 42. In addition, FIG. 12 is a cross sectional view showing the angle adjusting part 42.

Figure 12:
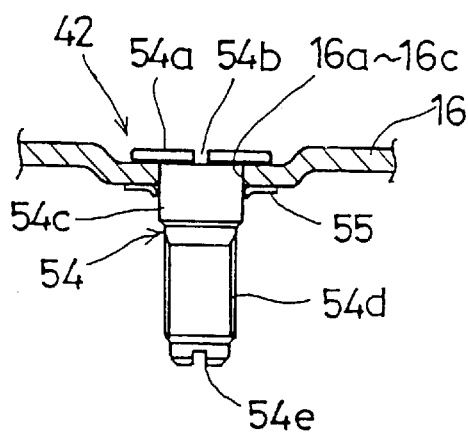
FIG. 12 is a cross sectional view showing the angle adjusting part.

As shown in FIGS. 11 and 12, the angle adjusting part 42 includes an adjusting screw 54 which rotatably penetrates a corresponding one of the mounting holes 16a through 16c in the movable base 16, and a holding ring 55 which holds the adjusting screw 54 so as not to fall. In addition, the angle adjusting part 42 adjusts the angle of the pickup 15 with respect to the reference disk by adjusting the relative positions between the movable base 16 and the guide shaft 19 and the lead screw 21, as will be described later.

The adjusting screw 54 has a head part 54a having a diameter greater than the diameter of a corresponding one of the mounting holes 16a through 16c in the movable base 16, a first driver groove 54b formed in the head part 54a, a shaft 54c which is inserted into the corresponding one of the mounting holes 16a through 16c, an external thread 54d which is formed on the outer periphery of the shaft 54c, and a second driver groove 54e which is formed at the tip end part of the external thread 54d.

Accordingly, the adjusting screw 54 can be turned from either end, that is, the first driver groove 54b or the second driver groove 54e, and the adjusting operation can be carried out from the upper surface side or the lower surface side of the movable base 16.

On the other hand, the head part 54a of the adjusting screw 54 contacts the upper surface of the movable base 16 at the corresponding one of the mounting holes 16a through 16c, while the holding ring 55 is fitted on the shaft 54c and contacts the lower surface of the movable base 16 at the corresponding one of the mounting holes 16a through 16c. Thus, the adjusting screw 54 is mounted in a rotatable state and so as not to slip out from the corresponding one of the mounting holes 16a through 16c in the movable base 16.

Figure 13A:
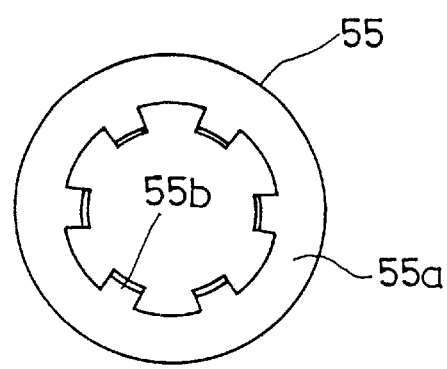
FIGS. 13A and 13B respectively are a plan view and a cross sectional view showing the construction of a holding ring.
Figure 13B:
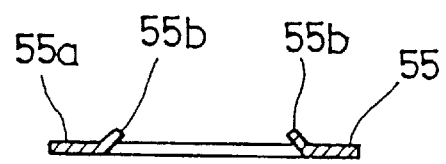

FIGS. 13A and 13B respectively are a plan view and a cross sectional view showing the construction of the holding ring 55.

As shown in FIGS. 13A and 13B, the holding ring 55 has a ring part 55a, and a plurality of holding parts 55b on the inner periphery of the ring part 55a. The plurality of holding parts 55b are inclined in the axial direction of the holding ring 55. For this reason, when the holding ring 55 is fitted on the shaft 54c of the adjusting screw 54, the tip end parts of the holding parts 55b are deformed in the outer peripheral direction of the holding ring 55, thereby facilitating the fitting of the holding ring 55 on the shaft 54c. However, when an attempt is made to pull the adjusting screw 54 in the opposite direction, the holding parts 55b of the holding ring 55 bite the shaft 54c of the adjusting screw 54, thereby holding the adjusting screw 54.

FIG. 14 is a cross sectional view showing the fixing parts 51 through 53.

As shown in FIG. 14, each of the fixing parts 51 through 53 of the movable base 16 includes a rubber block 56. This rubber block 56 is fixed on the lower surface side of each of the fixing parts 51 through 53 which is fixed on the sub chassis which will be described later. This rubber block 56 functions as a damper which resiliently supports the movable base 16, and also functions as a spacer.

FIGS. 15A and 15B respectively are a plan view and a cross sectional view showing a guide shaft base 60 which is mounted on the guide shaft mounting part 48 of the movable base 16.

As shown in FIGS. 15A and 15B, the guide shaft base 60 includes holding parts 60a and 60b which receive and hold end parts 19a and 19b of the guide shaft 19, an extension part 60c which extends between the holding parts 60a and 60b, a spring mounting groove 60d which is formed on the upper surface side of the extension part 60c, a pair of nut members 61 press-fit in the vicinity on both ends of the extension part 60c, and a screw 62 which secures the end part 19a held by the holding part 60a.

The guide shaft base 60 is secured on the guide shaft mounting part 48 of the movable base 16 in a state where the guide shaft 19 is held by the guide shaft base 60 and the external thread 54d of the adjusting screw 54 is screwed into the internal thread 61a of the nut member 61. The position of the guide shaft 19 held on the guide shaft base 60 is adjusted with respect to the movable base 16 by turning the adjusting screw 54. As a result, the mounting position of the pickup 15 which is guided by the guide shaft 19, that is, the angle of the pickup 15 with respect to the reference disk, is adjusted.

Figure 16A:
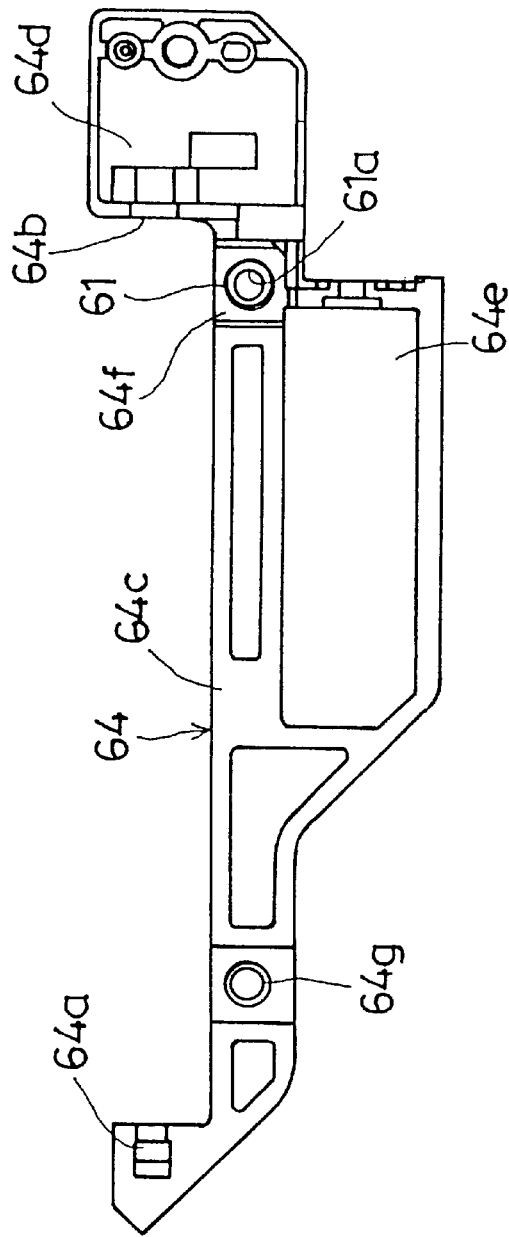
FIGS. 16A through 16C respectively are diagrams showing a lead screw base to be mounted on a lead screw mounting part of the movable base.
Figure 16B:
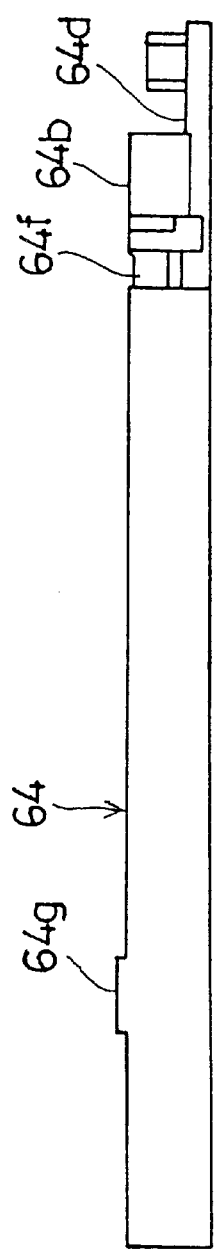
Figure 16C:
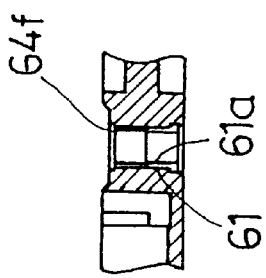

FIGS. 16A, 16B and 16C respectively are a plan view, a side view and a cross sectional view showing a lead screw base 64 which is mounted on the lead screw mounting part 47 of the movable base 16. FIG. 16C shows the cross section of a part of the lead screw base 64.

Figure 17:
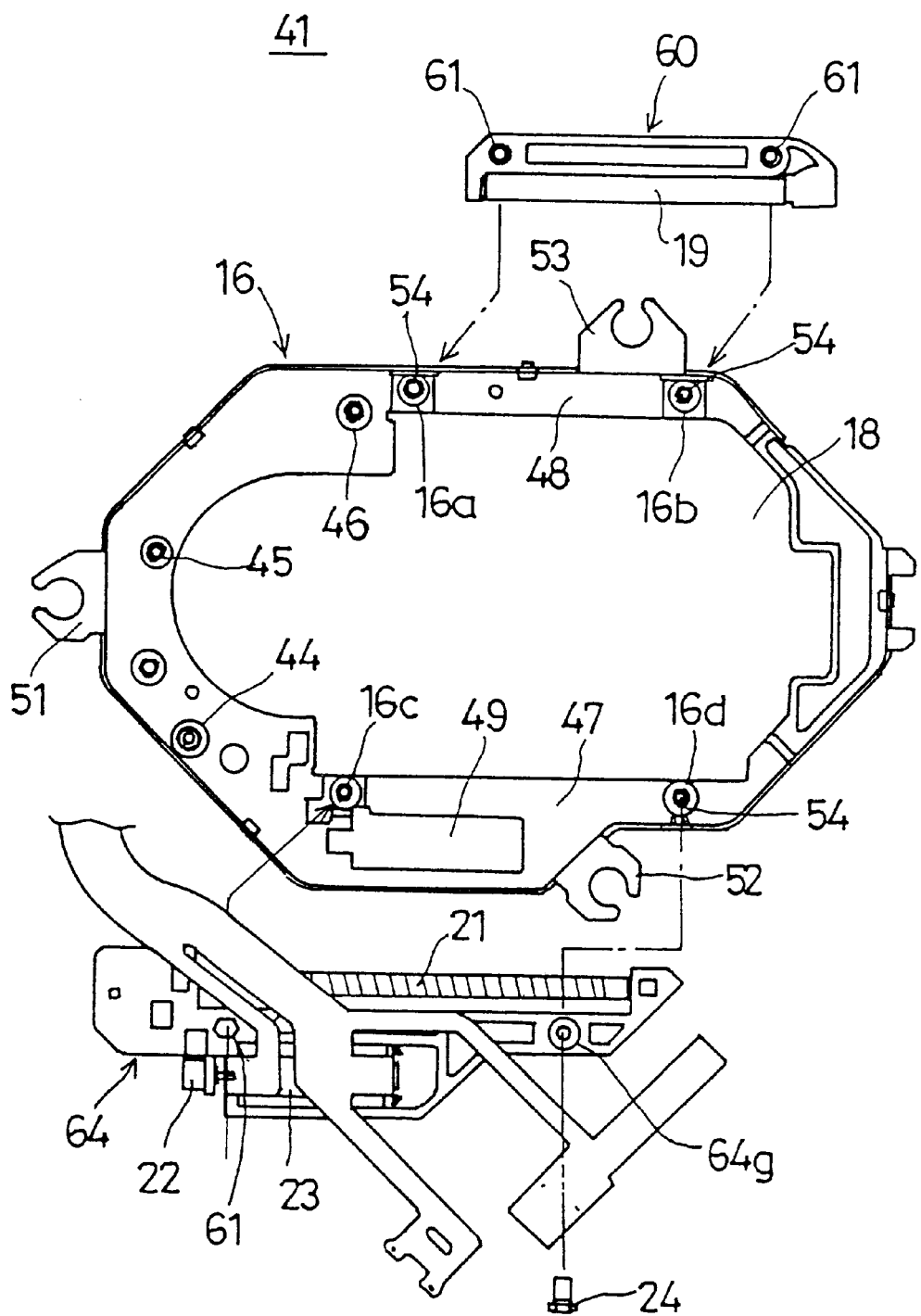
FIG. 17 is a bottom view showing mounting positions of the guide shaft mounting base and the lead screw mounting base.

As shown in FIGS. 16A through 16C, the lead screw base 64 includes holding parts 64a and 64b for holding the end parts of the lead screw 21, an extension part 64c which extends between the holding parts 64a and 64b, a gear support part 64d on which the gear mechanism 22 is arranged, a motor support part 64e on which the pickup driving motor 23 is mounted, a mounting part 64f into which the nut member 61 is press-fit, and a mounting part 64g into which the fixing screw 24 shown in FIG. 17 and fixed on the movable base 16 is inserted.

The mounting part 64g of the lead screw base 64 is fixed on the movable base 16, and the position of the lead screw base 64 with respect to the movable base 16 is adjusted by turning the adjusting screw 64 which is screwed into the nut member 61 in the mounting part 64f. Hence, the mounting position of the pickup 15 which is driven while being guided by the lead screw 21, that is, the angle of the pickup 15 with respect to the reference disk, is adjusted.

FIG. 17 is a bottom view showing the mounting positions of the guide shaft base 60 and the lead screw base 64.

As shown in FIG. 17, the guide shaft base 60 is mounted on the guide shaft mounting part 48 of the movable base 16, in a state where the guide shaft base 60 supports the guide shaft 19. In addition, the lead screw base 64 is mounted on the lead screw mounting part 47 of the movable base 16, in a state where the lead screw base 64 supports the lead screw 21, the gear mechanism 22 and the pickup driving motor 23.

Because the guide shaft base 60 and the lead screw base 64 are independent parts, it is possible to independently adjust the mounting position of the guide shaft 19 which movably supports the pickup 15 and the mounting position of the lead screw 21. For this reason, it is possible to carry out the adjustment with a high precision, without introducing a positional deviation of the lead screw 21 when adjusting the position of the guide shaft 19, and without introducing a positional deviation of the guide shaft 19 when adjusting the position of the lead screw 21.

Figure 18:
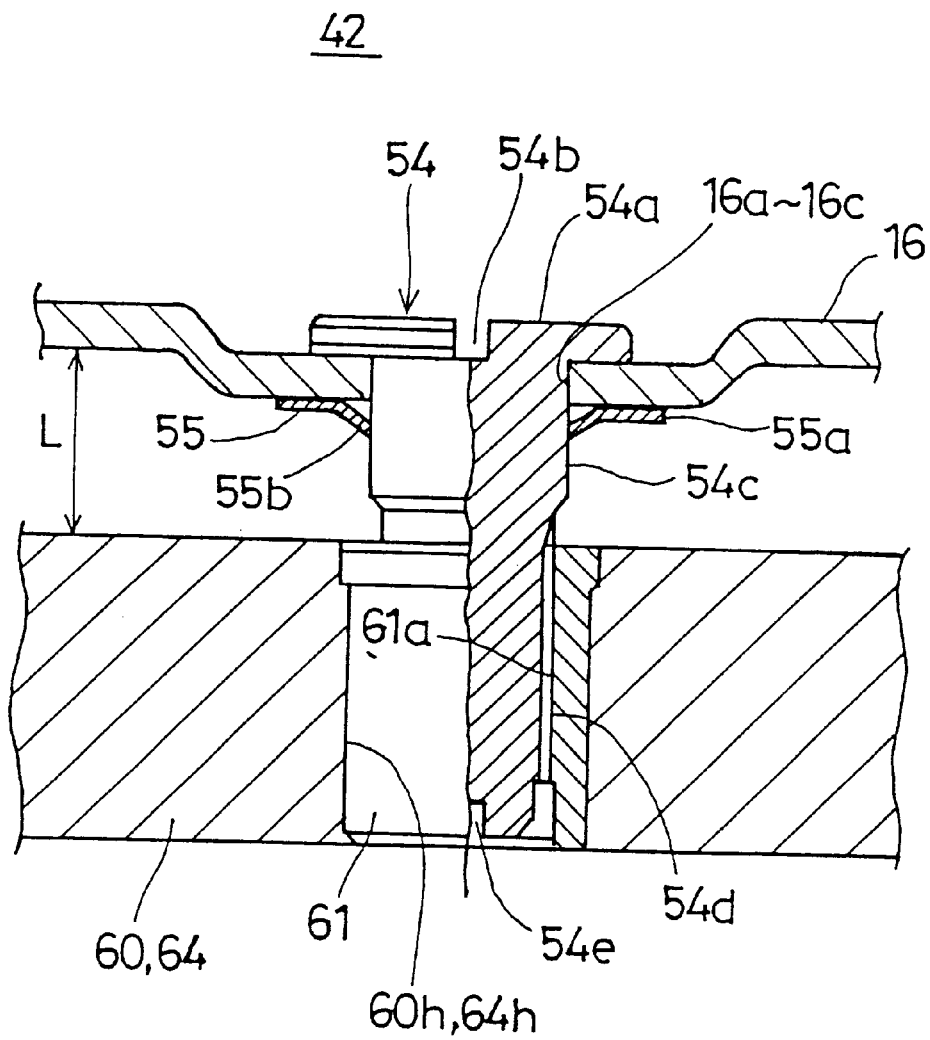
FIG. 18 is a cross sectional view showing a mounted state of the angle adjusting part.

FIG. 18 is a cross sectional view showing the mounted state of the angle adjusting part 42.

As shown in FIG. 18, the nut member 61 of the angle adjusting part 42 is press-fit in a hole 60h of the guide shaft base 60 and a hole 64h of the lead screw base 64. The nut member 61 is provided with an internal thread 61a which is provided on the inner wall penetrating the nut member 61 in the axial direction thereof.

The external thread 54d of the adjusting screw 54 is screwed into the internal thread 61a of the nut member 61 when a tool, such as a minus-type driver, engages the first driver groove 54b and turns the adjusting screw 54 clockwise, in a state where the adjusting screw 54 is inserted into a corresponding one of the mounting holes 16a through 16c in the movable base 16. As a result, the second driver groove 54e provided at the tip end of the external thread 54d becomes exposed at the opening on the lower surface side of the internal thread 61a of the nut member 61.

For this reason, when adjusting the mounting angle of the pickup 15 by varying the relative distance (gap) L of the movable base 16 from the guide shaft 19 and the lead screw 21 after the mounting, the adjusting screw 54 can be turned and adjusted from both ends, namely, from the first driver groove 54b on the upper surface side and from the second driver groove 54e on the lower surface side. Consequently, it is possible to easily carry out the operation of adjusting the mounting angle of the pickup 15 with respect to the reference disk.

The relative position between the movable base 16 and the nut member 61 which is press-fit into the guide shaft base 60 and the lead screw base 64 is adjusted by turning the adjusting screw 54. Hence, the guide shaft 19 which is held by the guide shaft base 60 and the lead screw 21 which is held by the lead screw base 64 are adjusted to positions depending on the rotary position of the adjusting screw 54. Therefore, the mounting position of the pickup 15 which is guided by the guide shaft 19 and the lead screw 21, that is, the angle of the pickup 15 with respect to the reference disk, is adjusted.

The height position of the angle adjusting part 42 is adjusted at 3 positions in the manner described above, so as to adjust the mounting angles of the guide shaft 19 and the lead screw 21 with respect to the movable base 16, that is, to adjust the angle of the pickup 15 supported on the movable base 16. The fixing screw 24 is fixedly screwed into the mounting hole 16*d* of the movable base 16 from among the mounting holes 16*a* through 16*d*, while the height position of each angle adjusting part 42 is adjusted at the 3 positions corresponding to the remaining mounting holes 16*a* through 16*c*. As a result, it is possible to prevent excessive movement of the pickup 15.

Accordingly, the reflected light from the reference disk which is used for the positional adjustment is detected by the pickup 15 in a state where the reference disk is clamped on the turntable 12. In this state, the mounting angle of the pickup 15 is adjusted while measuring an angular error of the reflected light from the reference disk detected by the pickup 15 by a measuring unit (automatic collimator), so that the angle of the reflected light from the reference disk becomes a prescribed value.

Next, a description will be given of the steps of assembling the pickup adjusting mechanism 41 having the above described construction, by referring to FIGS. 19 through 21.

Figure 19:
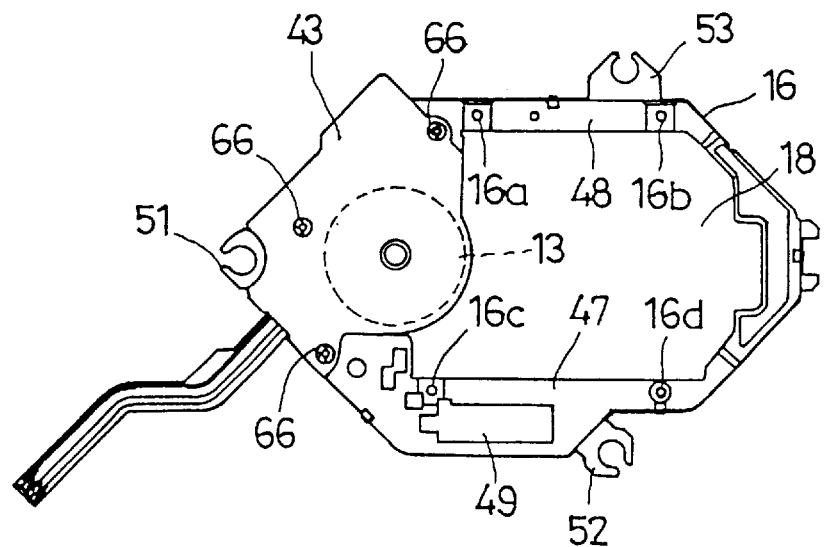
FIG. 19 is a bottom view showing a state where the motor base is mounted on a lower surface side of the movable base.

First, as shown in FIG. 19, the motor base 43 which supports the driving motor 13 for driving the turntable 12 is secured by screws 66 on the support parts 44 through 46 which project from the lower surface side of the movable base 16.

Figure 20:
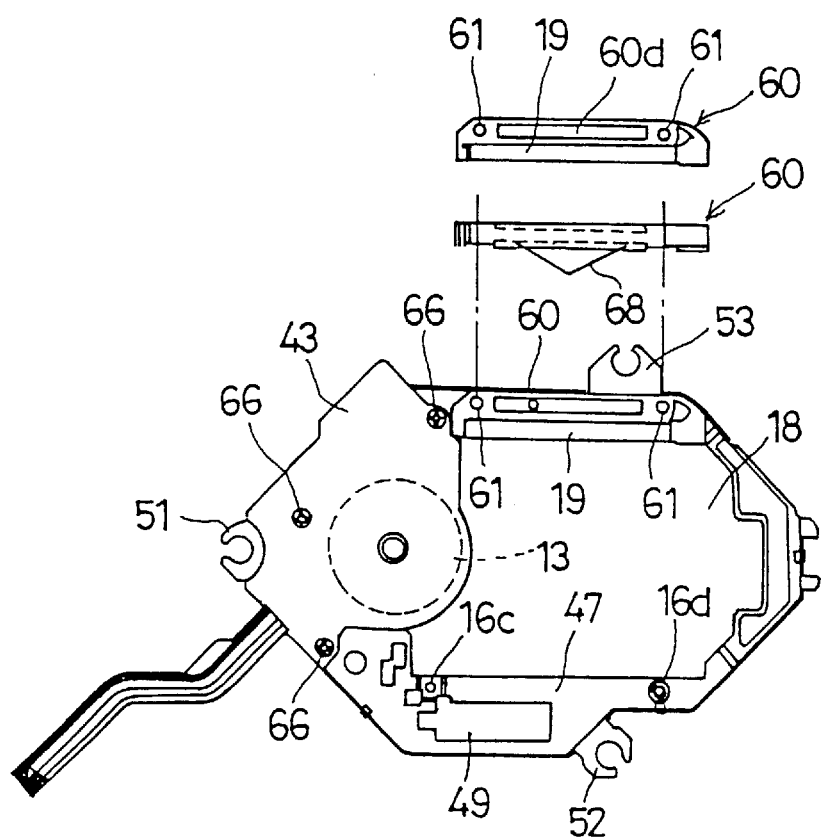
FIG. 20 is a bottom view showing a state where the guide shaft base is mounted on the guide shaft mounting part.

Next, as shown in FIG. 20, the guide shaft base 60 which holds the guide shaft 19 is mounted on the guide shaft mounting part 48. In this state, the adjusting screws 54 in the mounting holes 16*a* and 16*b* of the movable base 16 are screwed into the nut members 61 which are press-fit into the guide shaft base 60.

In addition, both ends of a leaf spring 68 which projects in a triangular shape slidably fit into the spring mounting groove 60*d* which is formed on the upper surface of the guide shaft base 60. When the vertex of the projecting triangular shape of this leaf spring 68 contacts the guide shaft mounting part 48 of the movable base 16 and is pushed thereby, both end parts of the leaf spring 68 slide within the spring mounting groove 60*d* and are linearly deformed.

As a result, the guide shaft base 60 is constantly urged in one direction by a spring force of the leaf spring 68 which is deformed within the spring mounting groove 60*d*, and a play of the guide shaft base 60 with respect to the movable base 16 is prevented.

Figure 21:
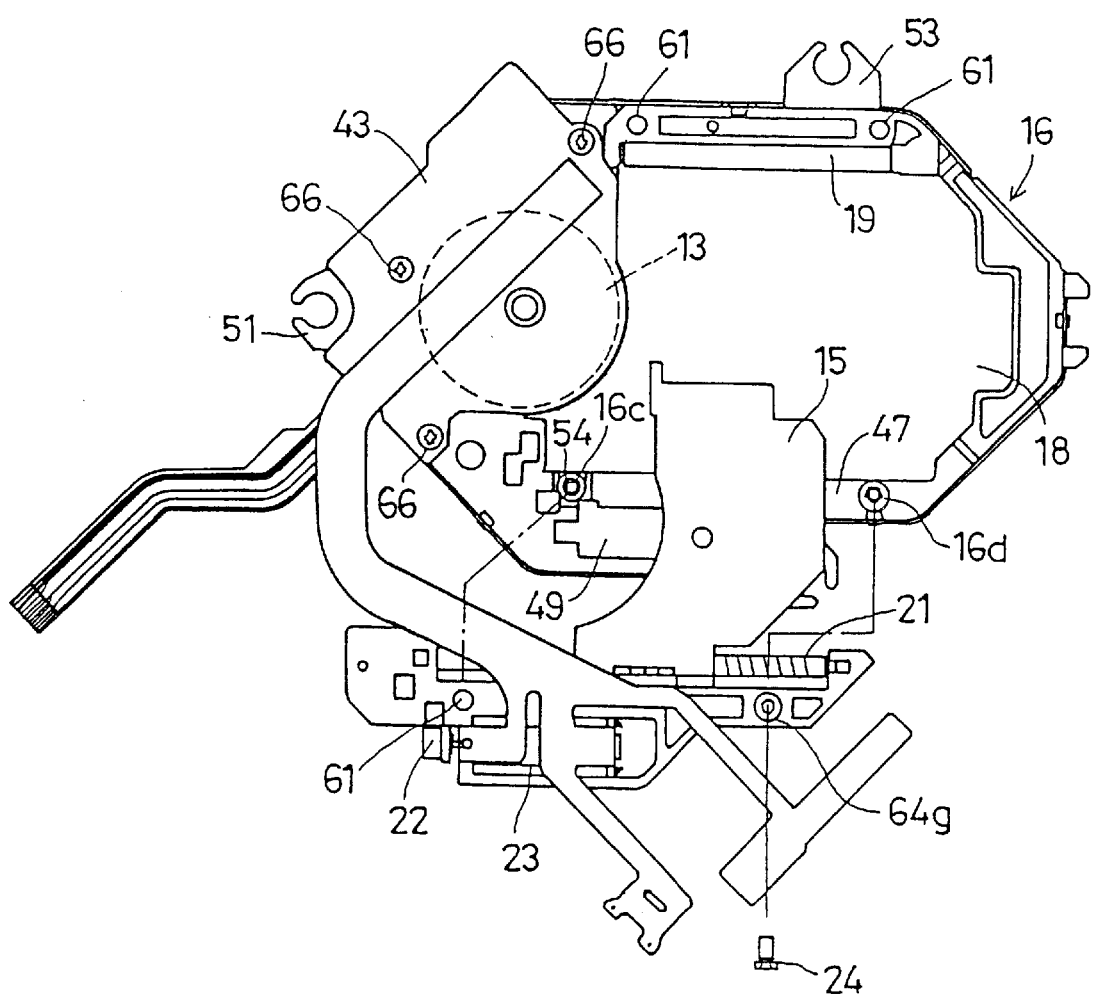
FIG. 21 is a bottom view showing a state where the lead screw base is mounted on the lead screw mounting part.

Next, as shown in FIG. 21, the lead screw base 64 which supports the pickup 15, the lead screw 21, the gear mechanism 22 and the pickup driving motor 23 is mounted on the lead screw mounting part 47. Then, the mounting part 64*g* of the lead screw base 64 is fixed on the movable base 16 by the fixing screw 24. Further, the adjusting screw 54 in the mounting hole 16*c* of the movable base 16 is screwed into the nut member 61 which is press-fit into the mounting part 64*f* of the lead screw base 64.

Thereafter, the mounting angle of the pickup 15 with respect to the reference disk is adjusted by adjusting the adjusting screws 54 in the mounting holes 16*a* through 16*c* of the movable base 16 while the angular error of the reflected light from the reference disk is detected by the pickup 15 by a measuring unit (automatic collimator), so that the angle of the reflected light from the reference disk becomes a prescribed value.

Next, a description will be given of a disk unit which may be applied with the pickup adjusting mechanism 11 and 41 described above.

Figure 22:
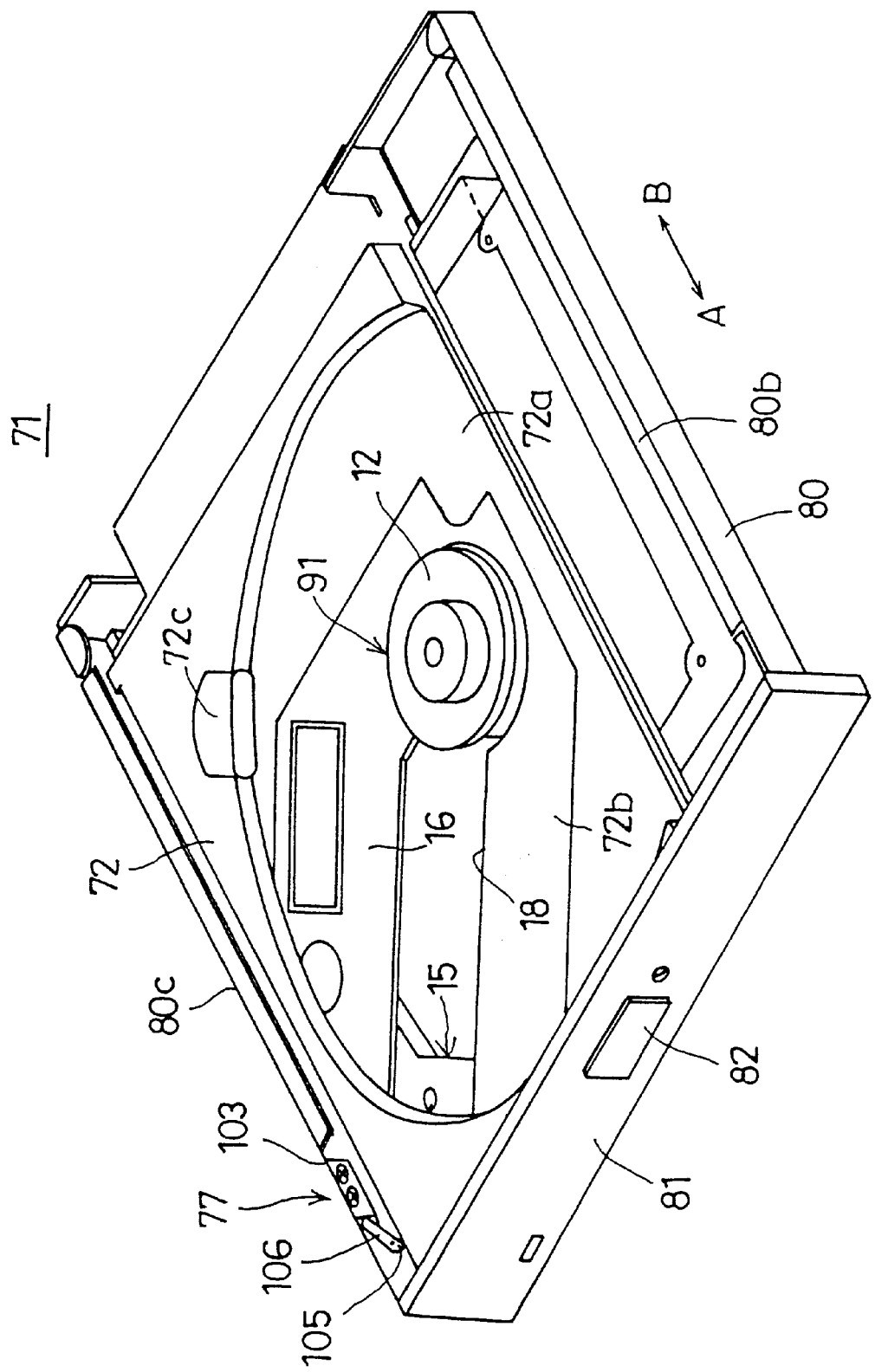
FIG. 22 is a perspective view showing a CD-ROM drive unit which is used as a disk unit.
Figure 23:
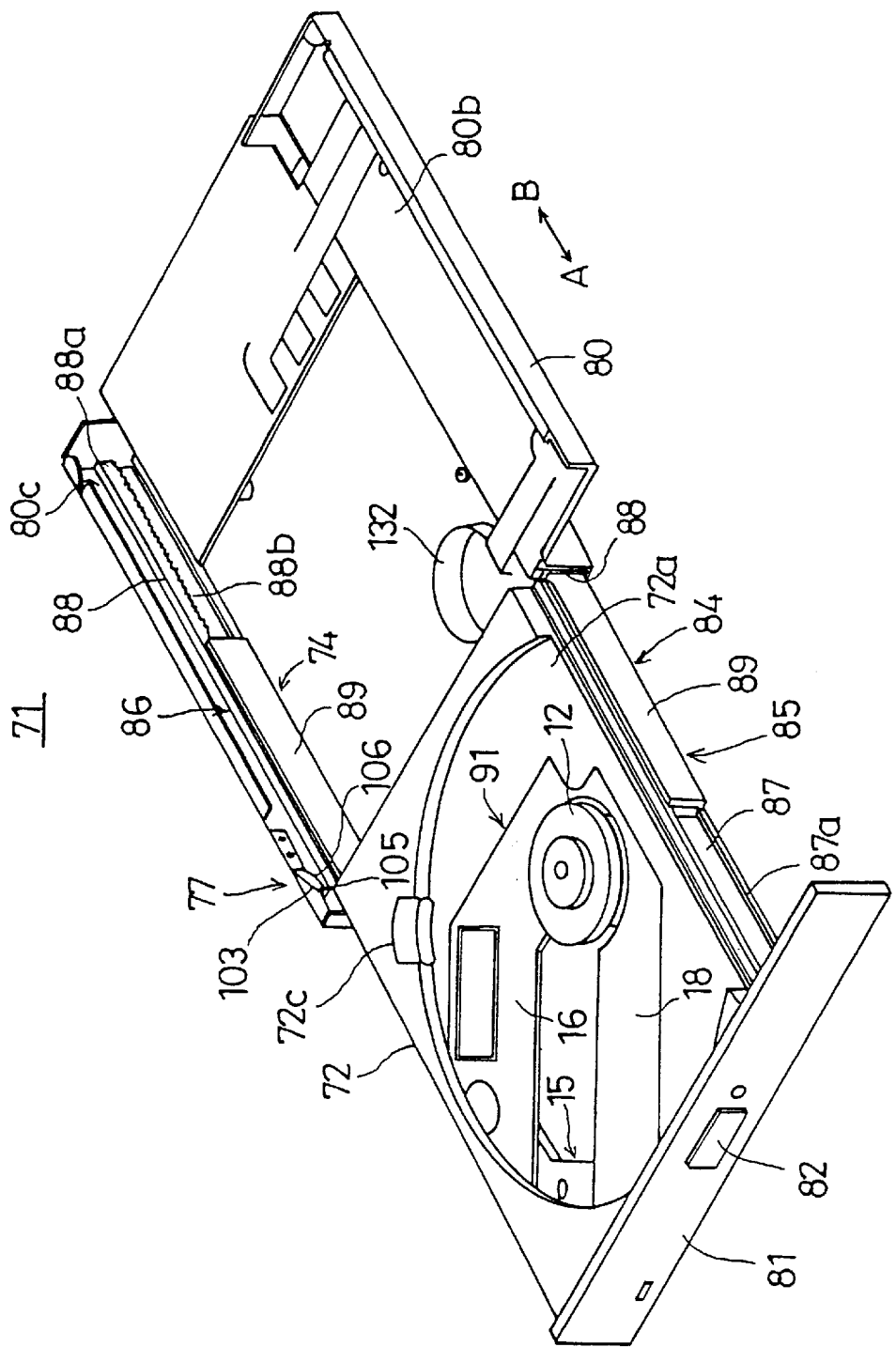
FIG. 23 is a perspective view showing the CD-ROM drive unit in a state where a tray is pulled out.

FIG. 22 is a perspective view showing a CD-ROM drive unit which is used as the disk unit. FIG. 23 is a perspective view showing the CD-ROM drive unit in a state where a tray is pulled out. In addition, FIG. 24 is a disassembled perspective view showing a top half of the CD-ROM drive unit, and FIG. 25 is a disassembled perspective view showing a bottom half of the CD-ROM drive unit.

As shown in FIGS. 22 through 25, a CD-ROM drive unit (hereinafter simply referred to as a drive unit) 71 is built into a housing of a portable personal computer (not shown) as a disk unit.

The drive unit 71 generally includes a tray 72 for receiving a disk (not shown), a sub chassis 73 for supporting the tray 72, a tray slide mechanism 74 for slidably supporting the tray 72, an optical pickup 15 provided on the sub chassis 73, a turntable 12 for rotationally driving a disk (CD-ROM) placed thereon, a holding mechanism 77 for holding the tray 72 when the tray 72 moves to a disk replacing position, and a lock mechanism 78 for locking the tray 72 when the tray 72 moves to a disk loading position.

Figure 24:
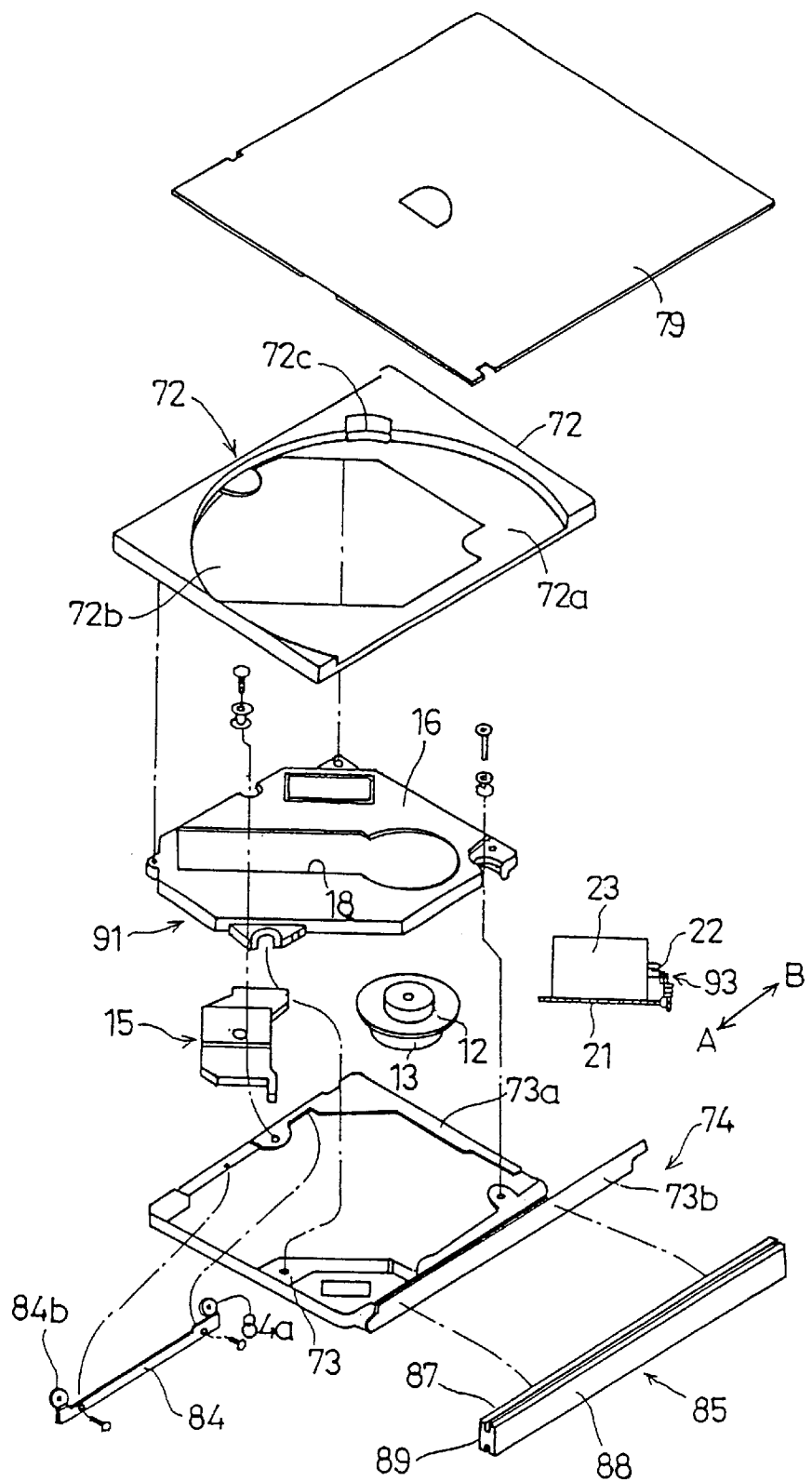
FIG. 24 is a top half of a disassembled perspective view showing the CD-ROM drive unit.

FIG. 22 shows the tray 72 in a state where a top plate 79 shown in FIG. 24 is removed and the tray 72 is moved to the disk loading position and accommodated within the drive unit 71. FIG. 23 shows the tray 72 in a state where the top plate 79 is removed and the tray 72 is moved to the disk replacing position where the tray 72 is pulled outside the drive unit 71.

The tray 72 has a horizontal width dimension which is smaller than the outer diameter of the disk (not shown), so that a part of the disk overhangs from the tray 72. The tray 72 slides in directions A and B between the disk replacing position and the disk loading position.

A chassis 80 includes an accommodating part 80*a* for accommodating the various mechanisms described above, and a cover part 80*b* which covers a part below the disk which overhangs from the tray 72 so as to protect the overhanging part of the disk. A space under the cover part 80*b* is a free space, and for example, this space may be used to arrange other units within the portable personal computer which is mounted with the drive unit 71.

A front face bezel 81 is fixed on the front end of the tray 72, and slides in the directions A and B together with the tray 72. A switch button 82 for releasing the lock of the lock mechanism 78 when the tray 72 is pulled out is provided at the central part of the front face bezel 81. Accordingly, n the switch button 82 is turned ON in the state shown in FIG. 22, the front face bezel 81 projects frontwards (in the direction A) by approximately 5 to 10 mm as will be described later, so as to facilitate the pulling out of the tray 72.

As shown in FIGS. 23 and 24, the tray 72 includes a disk confronting surface 72*a* which forms a space for receiving the disk, an opening 72*b* formed in the disk confronting surface 72*a* for the pickup 15 and the turntable 12, and an arcuate opening 72*c*. The user's finger is inserted into this arcuate opening 72*c* when removing the disk which is placed on the disk confronting surface 72*a*.

The horizontal width dimension of the disk confronting surface 72a is set to cover the accommodating part 80a of the chassis 80, and is smaller than the outer diameter of the disk so as to cover approximately ⅔ of the disk. Hence, as shown in FIG. 26A which will be described later, the peripheral edge part on the right side of a disk $D_A$ overhangs to the side from the disk confronting surface 72a of the tray 72.

For this reason, when removing the disk $D_A$, it is possible to hold the peripheral edge part of the disk $D_A$ overhanging from the disk confronting surface 72a. Thus, it is unnecessary to provide on the tray 72 a recess exclusively for allowing the disk $D_A$ to be held, and instead, the entire space on the right side of the tray 72 can be used to hold the disk $D_A$. Therefore, when holding the disk $D_A$, the user puts one finger against the peripheral edge part of the disk $D_A$ overhanging from the disk confronting surface 72a, and inserts another finger in the arcuate opening 72a against the peripheral edge part on the opposite end of the disk $D_A$.

In addition, since the arcuate opening 72c is provided in a free space in the corner part of the tray 72 and does not occupy the left part of the tray 72, it is possible to minimize the horizontal width dimension of the left part of the tray 72. Consequently, the horizontal width dimension of the tray 72 is greatly reduced and the overall size of the tray 72 is considerably reduced compared to that of the conventional drive unit. As a result, it is possible to reduce the size of the drive unit 71. As described above, the horizontal width dimension of the accommodating part 80a of the chassis 80 is reduced in correspondence with the horizontal width dimension of the tray 72, and the cover part 80b for protecting the part of the disk $D_A$ overhanging from the tray 72 projects sidewards from the accommodating part 80a.

Figure 26A:
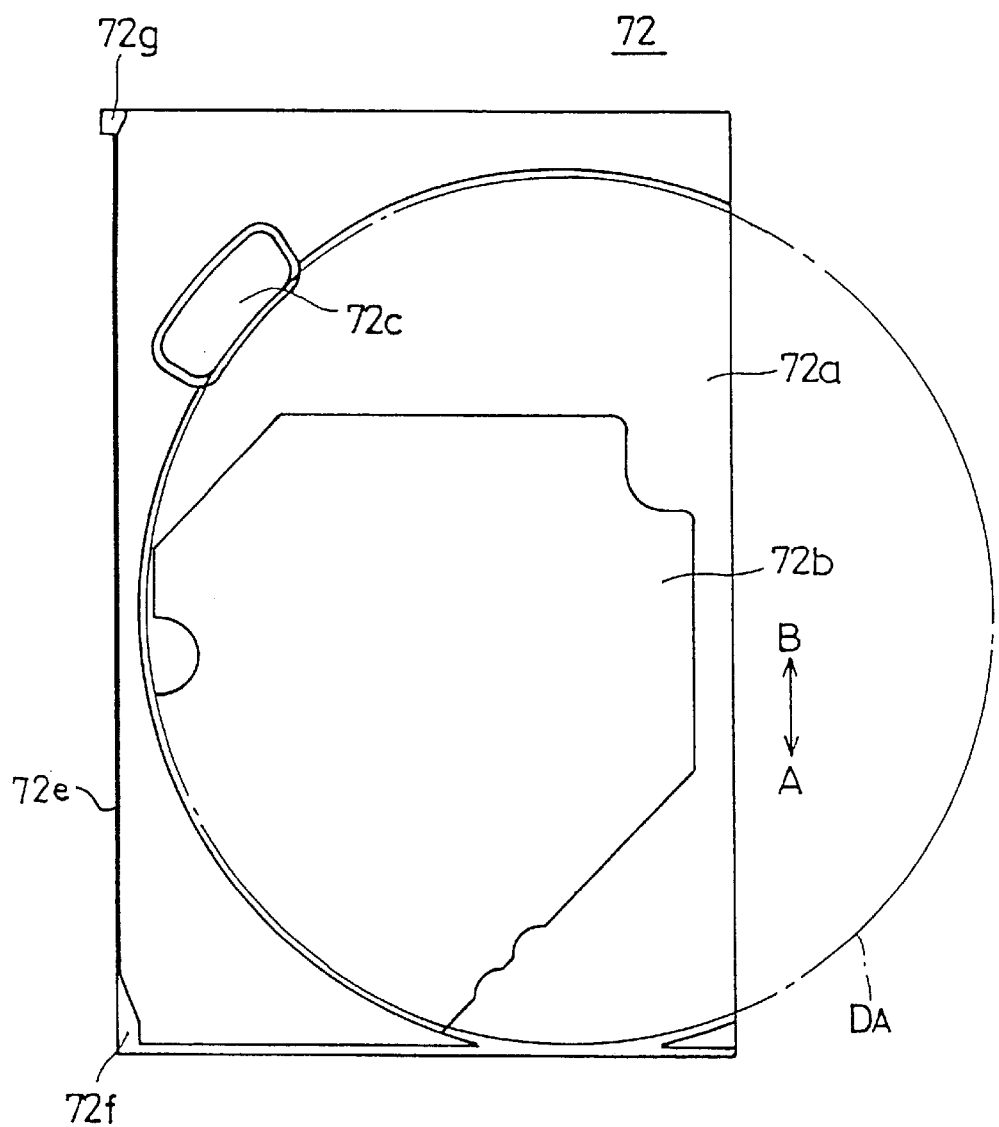
FIGS. 26A and 26B respectively are a plan view and a front view showing the tray.
Figure 26B:
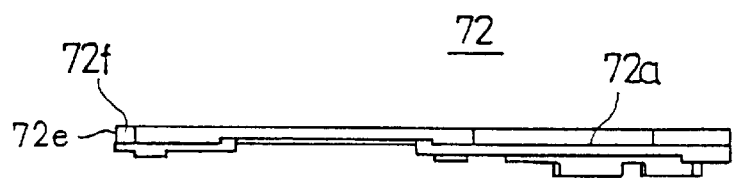

FIGS. 26A and 26B respectively are a plan view and a front view showing the tray 72.

The tray 72 is formed so that a part of the disk $D_A$ overhangs from the disk confronting surface 72a as indicated by a one-dot chain line in FIGS. 26A and 26B, and a disk holding direction on the right side of the tray 72 is not restricted. Hence, it is possible to easily remove the disk $D_A$ from the tray 72 by holding any peripheral part of the disk $D_A$ overhanging from the tray 72.

FIGS. 27A, 27B, 27C and 27D respectively are a plan view, a left side view, a right side view and a front view respectively showing the sub chassis 73.

As shown in FIGS. 27A through 27D, the sub chassis 73 includes a rectangular frame body 73a, a bracket 73b, and a guide rail pushing member 84 secured by screws on a left side surface 73c of the frame body 73a. The tray 72 is fixed on the frame body 73a, and the frame body 73a includes an opening for the pickup 15 and the turntable 12. The bracket 73b is provided on the right side surface of the frame body 73a, and extends in the directions A and B. The guide rail pushing member 84 includes a pair of pushing parts 84a and 84b projecting upwards from the frame body 73a.

As shown in FIGS. 24 and 25, the tray slide mechanism 74 includes a pair of guide rail mechanisms 85 and 86 which are mounted on both sides of the sub chassis 73.

Each of the pair of guide rail mechanisms 85 and 86 includes a movable rail 87 fixed on the bracket 73b of the sub chassis 73, a fixed rail 88 extending parallel to the movable rail 87, and a slide rail 89 interposed between the movable rail 87 and the fixed rail 88 and slidably engaging both the movable rail 87 and the fixed rail 88.

The movable rail 87 and the fixed rail 88 have a C-shaped cross section, and respectively have inwardly bent edge parts 87a and 88a. A rack 87b which extends in the longitudinal direction of the movable rail 87 is provided on the edge part 87a at the lower side of the movable rail 87. On the other hand, a rack 88b which extends in the longitudinal direction of the fixed rail 88 is provided on the edge part 88a at the upper side of the fixed rail 88.

The slide rail 89 has a H-shaped cross section, and has a groove 89c which is formed between a first track 89a and a second track 89b. The first track 89a is engaged by the edge part 87a of the movable rail 87. On the other hand, the second track 89b is engaged by the edge part 88a of the fixed rail 88.

A pinion 90 is rotatably accommodated at an intermediate position along the longitudinal direction of the groove 89c of the slide rail 89. The upper and lower parts of the pinion 90 respectively mesh with the racks 87b and 88b of the movable rail 87 and the fixed rail 88.

In the guide rail mechanism 85, the movable rail 87 is secured on a side wall 80c of the chassis 80 by screws, and the fixed rail 88 is secured by screws on the bracket 73b of the sub chassis 73 supporting the tray 72.

Accordingly, when the tray 72 is pulled out, the fixed rail 88 rotates the pinion 90 while sliding in the direction A with respect to the slide rail 89. As the pinion 90 rotates, the slide rail 89 slides in the direction A with respect to the movable rail 87.

In addition, as shown in FIGS. 23 and 24, a drive unit 91 which includes the pickup 15 and the turntable 12 is provided above the sub chassis 73. This drive unit 91 includes the movable base 16 which is disposed above the sub chassis 73, the pickup 15 which is mounted on the movable base 16, a pickup driving part 93 for moving the pickup 15 in the radial direction of the disk, and the turntable 12 mounted on the movable base 16.

The pickup driving part 93 includes the pickup driving motor 23 provided on the lower surface of the movable base 16, the transmitting mechanism 22 including a plurality of gears, the lead screw 21 driven via the transmitting mechanism 22, and the guide shaft 19 which extends parallel to the lead screw 21 and guides the pickup 15. Hence, the pickup 15 is arranged to confront the opening 18 of the movable base 16, extending in the radial direction of the disk. Both sides of the pickup 15 are guided in a freely slidable manner by the lead screw 21 and the guide shaft 19.

Because the pickup 15 has an engaging part 98 which engages a screw part of the lead screw 21, the pickup 15 moves in the radial direction of the disk when the lead screw 21 is rotated by the pickup driving motor 23.

The turntable 12 has the turntable driving motor 12 provided on the lower part thereof. This turntable driving motor 13 rotates the disk which is clamped on the turntable 12 at a constant rotational speed when the tray 72 reaches the disk loading position within the drive unit 71.

As shown in FIG. 25, the holding mechanism 77 is provided to hold the tray 72 when the tray 72 moves to the disk replacing position shown in FIG. 23. The holding mechanism 77 includes a first engaging member 101 provided on the tray 72, and a second engaging member 103 provided on the side wall 80c of the chassis 80. The first engaging member 101 engages an engaging hole 100 formed in the chassis 80 and holds the tray 72 when the tray 72 moves to the disk replacing position. The second engaging member 103 engages a recess of the tray 72 and holds the tray 72 when the tray 72 moves to the disk replacing position.

As shown in FIG. 25, the first engaging member 101 is provided on the end part of the bracket 73b of the sub chassis 73. The first engaging member 101 includes a leaf spring 101a secured on a lower surface 73d of the bracket 73, and an engaging part 101b provided on the tip end of the leaf spring 101a. The engaging part 101b includes a sliding contact surface 101c making sliding contact with the chassis 80, an engaging surface 101d which engages the engaging hole 100 in the chassis 80, and a sloping surface 101e which is used when the engaging part 101b disengages from the engaging hole 100.

Accordingly, when the tray 72 moves to the disk replacing position, the engaging part 101b engages the engaging hole 100 in the chassis 80, and the engaging surface 101d contacts the edge part of the engaging hole 100. Hence, the movement of the tray 72 in the direction A is restricted.

On the other hand, when the tray 72 moves in the direction B, the sloping surface 101e of the engaging part 101b rides over the edge part of the engaging hole 100 and assumes a lock released state. Thus, by the engagement of the first engaging member 101 and the engaging hole 100, the movement of the tray 72 at the disk replacing position is only restricted in the direction A and the movement of the tray 72 in the direction B is permitted.

The second engaging member 103 includes a roller 105 which rolls on a side wall 72e of the tray 72, and a roller support member 106 which supports the roller 105 in a freely rotatable manner. The roller 105 rolls on the side wall 72e of the tray 72 when the tray 72 moves, and restricts the movement of the tray 72 by engaging recesses 72f and 72g provided on the side wall 72e when the tray 72 moves to the disk loading position and the disk replacing position.

One end 106a of the roller support member 106 is secured on the side wall 80c of the chassis 80, and the roller 105 is supported on a tip end 106c of an arm part 106b. The arm part 106b of the roller support member 106 functions as a leaf spring which pushes the roller 105 in a direction E.

In other words, the roller support member 106 supports the roller 105 in a freely rotatable manner, and also functions as a leaf spring which pushes against the side wall 72e of the tray 72. Hence, the roller 105 engages the recess 72f when the tray 72 moves to the disk loading position and engages the recess 72g when the tray 72 reaches the disk replacing position, and holds the tray 72 at these positions, due to the pushing force of the roller support member 106.

Figure 28:
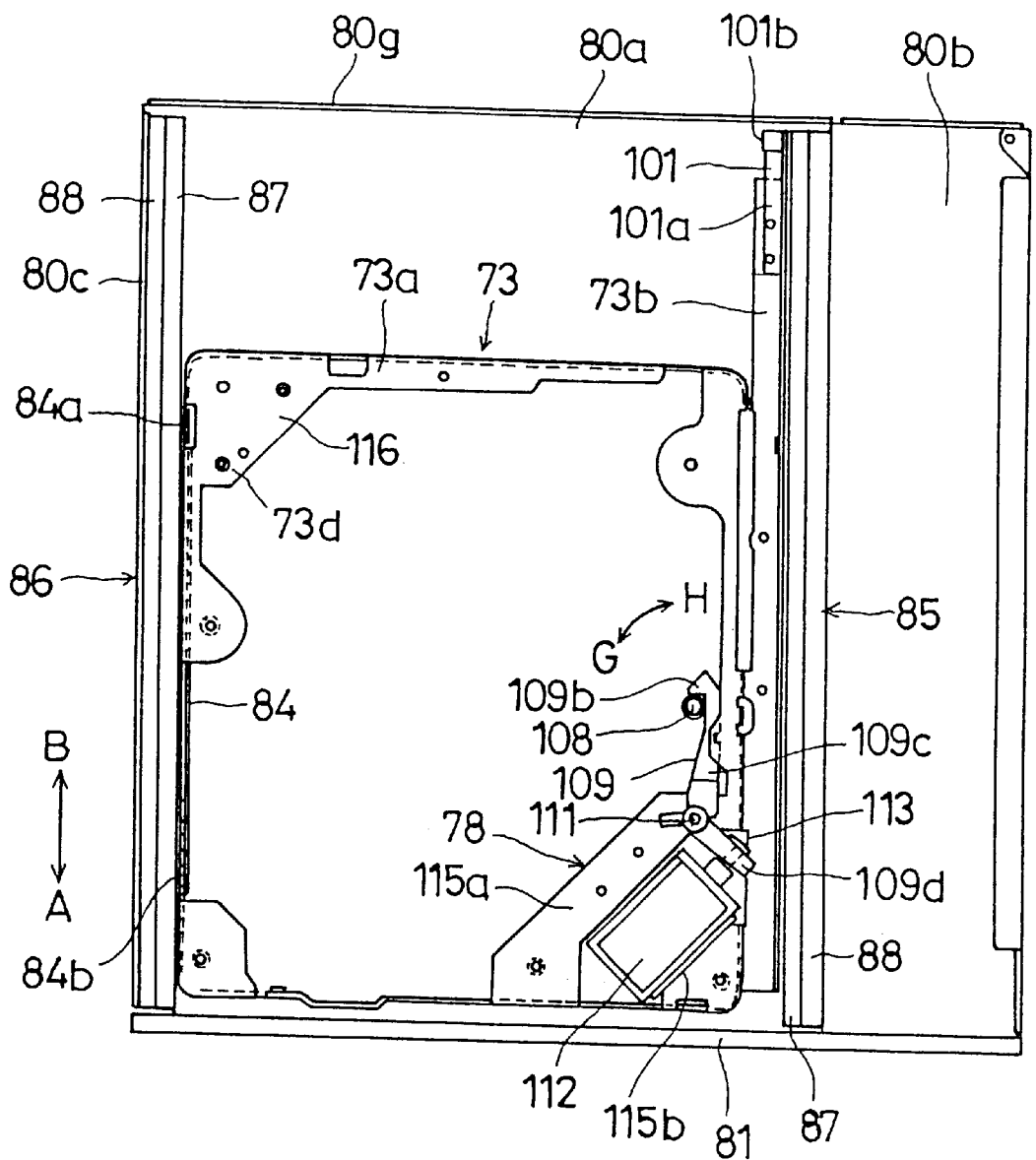
FIG. 28 is a plan view showing a state where both sides of the sub chassis are supported by guide rail mechanisms.

FIG. 28 is a plan view showing a state where both sides of the sub chassis 73 are supported by the guide rail mechanism 85 and 86.

As shown in FIG. 28, the lock mechanism 78 includes a lock lever 109 and a solenoid 110. The lock lever 109 is provided on a mounting part 115a of the frame body 73 of the sub chassis 73, and is engaged by an engaging roller 108 which is provided on a bottom part 80f of the chassis 80. The solenoid 110 is provided on a mounting part 115b of the frame body 73a of the sub chassis 73, and rotates the lock lever 109 to a lock position or a lock release position.

The lock lever 109 includes a bearing part 109a which fits over a shaft 111 which stands on the frame body 73a of the sub chassis 73, an arm 109c having a finger part 109b on a tip end thereof for engaging the engaging roller 108 of the chassis 80, and a linking arm 109d which is linked to a plunger 113 which is driven by a solenoid 112.

When the switch button 82 on the front face bezel 81 is turned ON, the solenoid 112 is energized and attracts the plunger 113. The end part of the plunger 113 penetrates a hole 109e in the linking arm 109d of the lock lever 109, and is linked to the linking arm 109d.

In addition, the plunger 113 attracts the linking arm 109d by the electromagnetic force of the solenoid 112. Hence, the lock lever 109 is urged in a direction G by a torsion spring (not shown), and assumes a locked state by engaging the finger part 109b to the engaging roller 108 by this spring force. When the plunger 113 is attracted by the electromagnetic force of the solenoid 112, the lock lever 109 rotates in a direction H about the shaft 111 and assumes a lock released state by disengaging the finger part 109b from the engaging roller 108.

Figure 29:
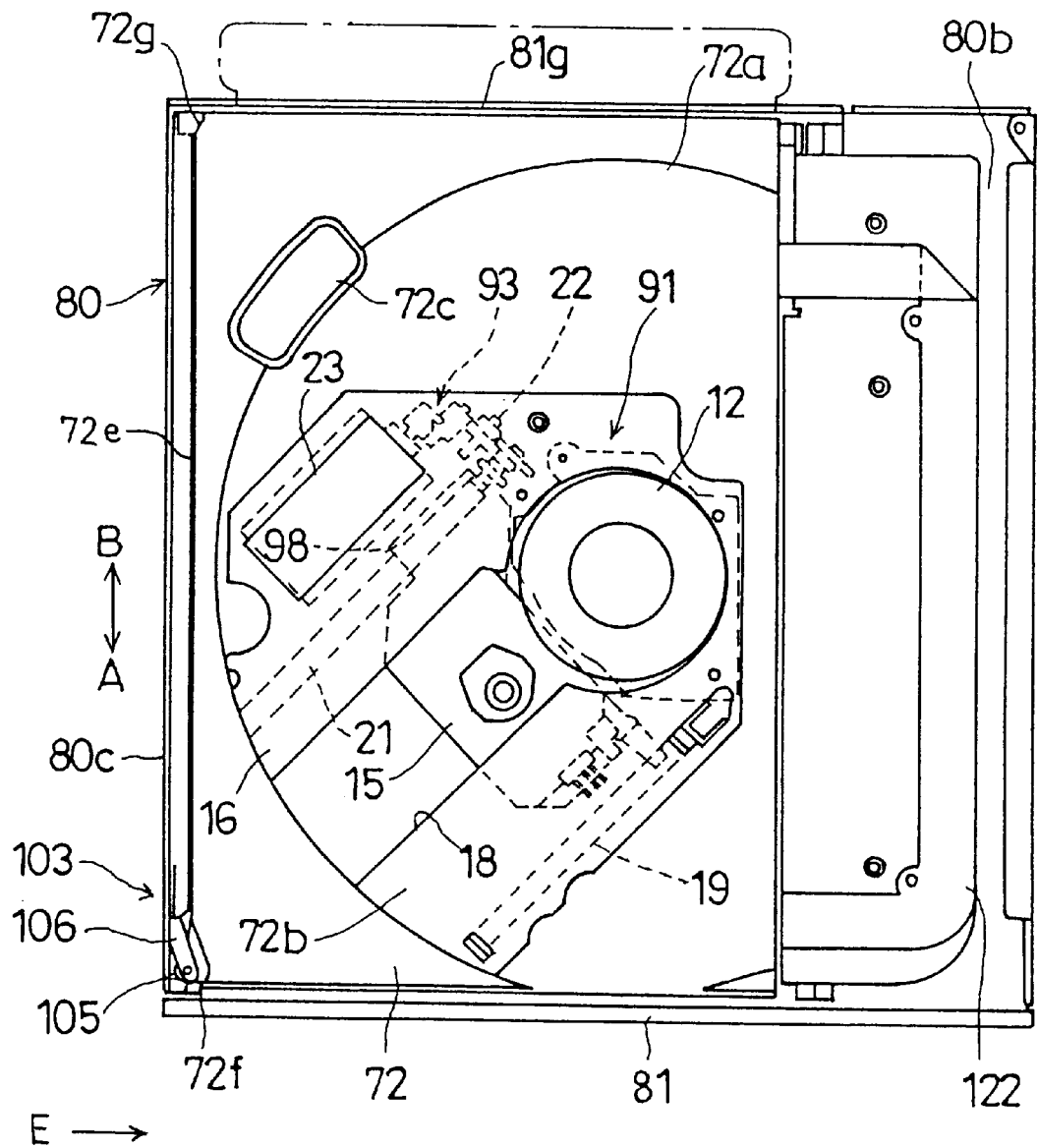
FIG. 29 is a plan view showing a loaded state where the tray is inserted into a disk loading position.

FIG. 29 is a plan view showing a loaded state where the tray 72 is inserted into the disk loading position.

When the switch button 82 on the front face bezel 81 is turned ON in a state where the tray 72 shown in FIG. 29 is inserted into the disk loading position, the locking by the lock mechanism 78 is released, the plunger 113 is attracted by the electromagnetic force of the solenoid 112, and the lock lever 109 rotates in the direction H about the shaft 111 thereby disengaging the finger part 109b from the engaging roller 108.

Figure 30:
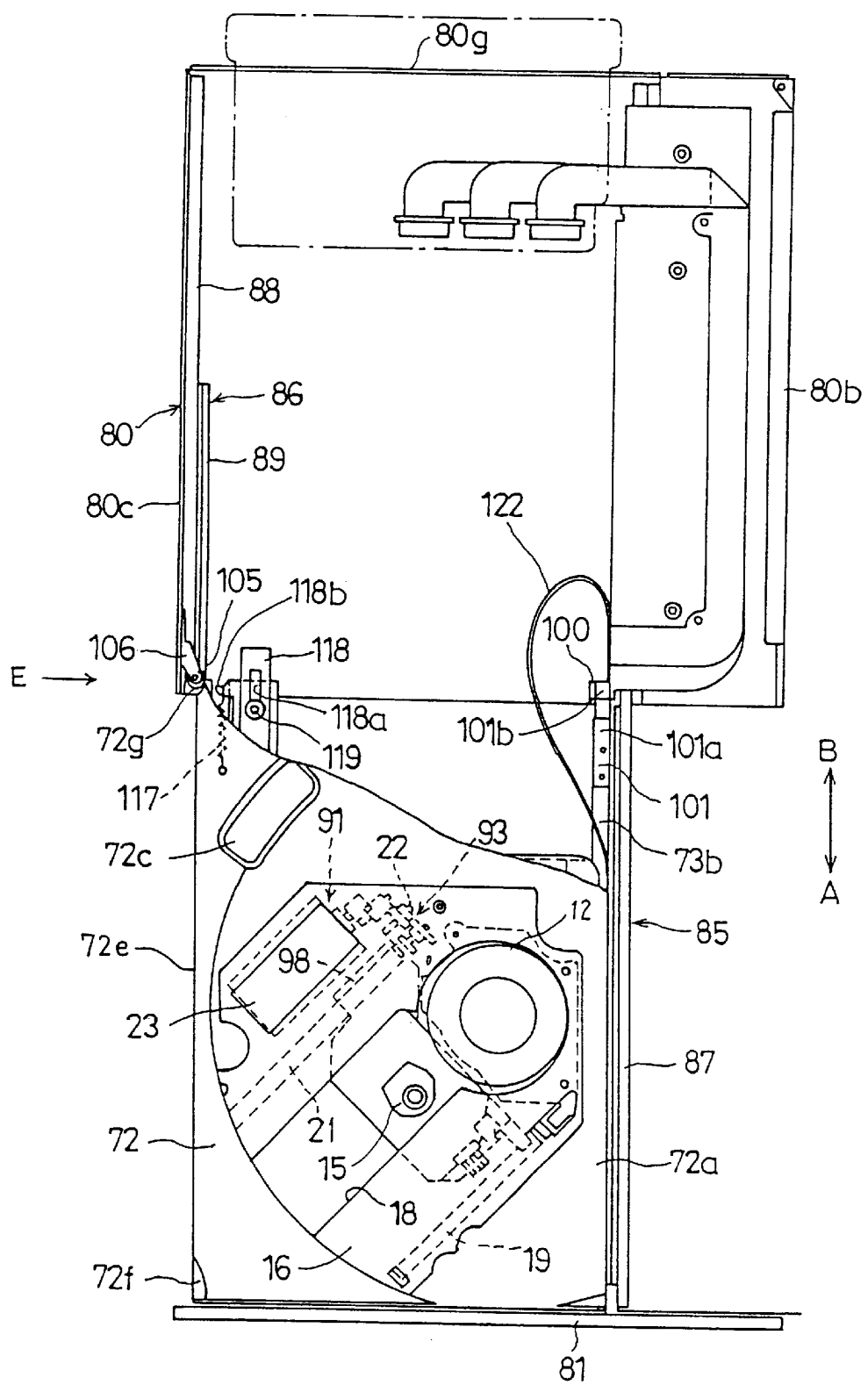
FIG. 30 is a plan view showing a state where the tray is pulled out to a disk replacing position.

FIG. 30 is a plan view showing a state where the tray 72 is pulled out to the disk replacing position.

As shown in FIG. 30, an ejecting push member 118 which is urged in the direction B by a coil spring 117 is provided on a mounting part 116 of the frame body 73a of the sub chassis 73. This ejecting push member 118 includes an elongated hole 118a which is engaged by a pin 119 which stands on the frame body 73 of the sub chassis 73, and is mounted in a state freely slidable in the directions A and B. One end of the coil spring 117 is hooked on a hook pin 73d of the sub chassis 73, and the other end of the coil spring 117 is hooked on a hook part 118b of the ejecting push member 118.

The ejecting push member 118 pushes against a read part 80g of the chassis 80 by a spring force of the coil spring 117. Hence, in reaction to this pushing spring force, the sub chassis 73 moves in the direction A.

As a result, the front face bezel 82 of the tray 72 which is provided on the sub chassis 73 moves predetermined distance in the direction A from the housing of the drive unit 71 (not shown), thereby facilitating the operation of pulling out the tray 72. When the front face bezel 82 is manually pulled in the direction A, the tray 72 moves to the disk replacing position as shown in FIG. 30.

A flexible cable 122 is arranged in a position bent in an approximately U-shape within a gap between the sub chassis 73 and the side wall of the accommodating part 80a of the chassis 80. Hence, the flexible cable 122 does not interfere with the sliding movement of the tray 72.

Next, a description will be given of the operation of the drive unit 71 having the above described construction.

In a state before the disk is loaded into the drive unit 71, the tray 72 is accommodated within the drive unit 71 as shown in FIGS. 22 and 29. In this state where the tray 72 is located at the disk loading position within the drive unit 71, the lock lever 109 of the lock mechanism 78 provided on the sub chassis 73 engages the engaging roller 108 of the chassis 80 as shown in FIG. 28, the roller 105 of the second engaging member 103 engages the recess 72f of the tray 72, and the tray 72 and the sub chassis 73 are held in the disk loading position within the drive unit 71.

When the switch button 82 on the front face bezel 81 is turned ON, the plunger 113 is attracted by the electromagnetic force of the solenoid 112, and the lock lever 109 rotates in the direction H about the shaft 111. Thus, the finger part 109b disengages from the engaging roller 108, thereby putting the lock mechanism 78 in the lock released state.

When the locking of the lock mechanism 78 with respect to the sub chassis 73 is released, the ejecting push member 118 pushes against the rear part 80g of the chassis 80 by the spring force of the coil spring 117. In reaction to this spring force, the sub chassis 73 and the tray 72 move in the direction A.

Although the roller 105 of the engaging member 103 engages the recess 72f of the tray 72, the roller 105 rides over the sloping part of the recess 72f and slides on the side wall 72e of the tray 72 when the ejecting push member 118 pushes against the rear part 80g of the chassis 80.

For this reason, the sub chassis 73 and the tray 72 move a predetermined distance in the direction A to a position where the front face bezel 82 projects from the housing of the drive unit 71 so as to facilitate the operation of pulling out the tray 72. When the front bezel 72 is manually pulled in the direction A, the movable rail of each of the guide rail mechanisms 85 and 86 slide in the direction A along the slide rail 89, and the slide rail 89 slides in the direction A along the fixed rail 88.

Furthermore, when the front face bezel 82 is pulled in the direction A, the sub chassis 73 and the tray 72 slide in the direction A while being guided by the guide rail mechanisms 85 and 86. When the sub chassis 73 and the tray 72 slide in the direction A, the roller 105 of the engaging member 103 rolls while being pushed by the side wall 72e of the tray 72, thereby preventing play of the tray 72 in the horizontal direction and ensuring a stable and smooth sliding operation.

As shown in FIGS. 23 and 30, when the tray 72 moves to the disk replacing position, the roller 105 of the engaging member 103 engages the recess 72g of the tray 72 with a click. In addition, the engaging part 101b of the first engaging member 101 engages the engaging hole 110 of the chassis 80, and the engaging surface 101d contacts the edge part of the engaging hole 100. As a result, the tray 72 is held at the disk replacing position, and the movement of the tray 72 in the direction A is restricted.

Accordingly, since the roller 105 of the engaging member 103 engages the recess 72g of the tray 72 as the front face bezel 82 is pulled in the direction A, the tray 72 is held with a click, thereby providing the user with a smooth and positive feel of operation that the disk replacing position is reached. Therefore, the tray 72 is prevented from being excessively pulled in the direction A and is prevented from falling from the housing of the drive unit 71. Moreover, it is also possible to prevent the user from releasing the tray 72 before the tray 72 reaches the disk replacing position as the tray 72 is being pulled manually in the direction A, because the user can easily recognize the disk replacing position when the tray 72 stops with the click.

When the tray 72 is held at the disk replacing position, the user removes the disk clamped on the turntable 12. The tray 72 is constructed so that, in this state, the part of the disk $D_A$ overhangs from the disk confronting surface 72a of the tray 72 as indicated by the dotted line in FIG. 26A. Hence, the disk holding direction on the right side of the tray 72 is not restricted, and it is possible to easily remove the disk $D_A$ from the tray 72 by holding the peripheral edge part of any overhanging part of the disk $D_A$.

Next, a new disk is clamped on the turntable 12, and the front face bezel 81 is thereafter pushed in the direction B.

When the front face bezel 81 is pushed in the direction B, the roller 105 of the engaging member 103 rides over the recess 72g of the tray 72 and reaches the side wall 72e. In addition, the sloping surface 101e of the engaging part 101b rides over the edge part of the engaging hole 100, and the engaging member 101 assumes the lock released state.

For this reason, he tray 72 slides from the disk replacing position in the direction B under the guidance of the guide rail mechanisms 85 and 86, and returns to the disk loading position shown in FIG. 22. In returning to the disk loading position, the roller 105 of the engaging member 103 rolls while being pushed by the side wall 72e of the tray 72, thereby preventing play of the tray 72 in the horizontal direction and ensuring a stable and smooth sliding operation.

When the tray 72 reaches the disk loading position, the roller 105 of the engaging member 103 engages the recess 72f of the tray 72 with a click, and the lock lever 109 of the lock mechanism 78 is engaged by the engaging roller 108 of the chassis 80. Accordingly, since the roller 105 of the engaging member 103 engages the recess 72f of the tray 72 as the front face bezel 82 is pushed in the direction B, the tray 72 is held with a click, thereby providing the user with a smooth and positive feel of operation that the disk loading position is reached.

In the embodiment described above, the present invention is applied to the CD-ROM drive unit. However, the present invention is of course similarly applicable to other disk drive units and disk units, such as a DVD unit.

Further, the present invention is not limited to these embodiments, but various variations and modifications may be made without departing from the scope of the present invention.

What is claimed is:

1. A pickup adjusting mechanism comprising:
    a turntable on which a disk-shaped recording medium is clamped;
    a disk motor which drives said turntable;
    a first base which supports said disk motor;
    a pickup which reads information recorded on the disk-shaped recording medium;
    a second base which is supported on said first base and movably supports said pickup; and
    an angle adjusting part which is provided between said first base and said second base, and adjusts an angle of said pickup with respect to the disk-shaped recording medium clamped on said turntable,
    said second base being supported at four positions with respect to said first base,
    said angle adjusting part being provided to make an adjustment at three of the four positions, so that the pickup is fixed at a predetermined one of the four positions, said predetermined one of the four positions being located on an outer peripheral side of the disk-shaped recording medium relative to at least two of said three positions.

2. The pickup adjusting mechanism as claimed in claim 1, wherein said angle adjusting part includes an adjusting screw which adjusts a gap between said second base and said first base.

3. The pickup adjusting mechanism as claimed in claim 1, wherein said second base comprises:
    a guide shaft base which supports a guide shaft guiding a movement of said pickup; and
    a lead screw base which supports a lead screw driving said pickup.

4. A pickup adjusting mechanism for adjusting a mounting angle of a pickup with respect to a disk-shaped recording medium which is placed on a turntable driven by a disk motor, comprising:
    a first base which supports the disk motor;
    a second base which is supported on said first base and movably supports the pickup; and an angle adjusting part which is provided between said first base and said second base, and adjusts the mounting angle of the pickup by adjusting a gap between said first base and said second base, said second base being supported at four positions with respect to said first base, said angle adjusting part being provided to make an adjustment at three of the four positions, so that the pickup is fixed at a predetermined one of the four positions, said predetermined one of the four positions being located on an outer peripheral side of the disk-shaped recording medium relative to at least two of said three positions.

5. The pickup adjusting mechanism as claimed in claim 4, wherein said angle adjusting part includes an adjusting screw which adjusts the gap between said first base and said second base.

6. The pickup adjusting mechanism as claimed in claim 5, wherein said adjusting screw penetrates said first base and said second base, and is adjustable from said first base and said second base.

7. The pickup adjusting mechanism as claimed in claim 4, wherein said second base is supported on said first base at a first number of positions, and said angle adjusting part is provided at a second number of positions, said first number being plural and greater than the second number.

8. A disk unit comprising:
 a turntable on which a loaded disk-shaped recording medium is clamped;
 a disk motor which drives said turntable;
 a first base which supports said disk motor;
 a pickup which at least reads information from the disk-shaped recording medium;
 a second base which is supported on said first base and movably supports said pickup; and
 an angle adjusting part which is provided between said first base and said second base, and adjusts an angle of said pickup with respect to the disk-shaped recording medium,
 said second base being supported at four positions with respect to said first base,
 said angle adjusting part being provided to make an adjustment at three of the four positions, so that the pickup is fixed at a predetermined one of the four positions,
 said predetermined one of the four positions being located on an outer peripheral side of the disk-shaped recording medium relative to at least two of said three positions.

9. The disk unit as claimed in claim 8, wherein said angle adjusting part includes an adjusting screw which adjusts a gap between said second base and said first base.

10. The disk unit as claimed in claim 9, wherein said adjusting screw penetrates said first base and said second base, and is adjustable from said first base and said second base.

11. The disk unit as claimed in claim 8, which further comprises:
 a guide shaft which guides a movement of said pickup; and
 a lead screw which drives said pickup,
 said second base comprising:
  a guide shaft base which supports said guide shaft; and
  a lead screw base which supports said lead screw.

12. A pickup adjusting mechanism for adjusting a pickup, comprising:
 a disk motor which rotates a disk-shaped recording medium which is loaded;
 a guide shaft base which has two ends and supports a guide shaft;
 a lead screw base which has two ends and supports a lead screw;
 a motor which is supported on the lead screw base and rotates the lead screw by coupling with the lead screw; and
 a support base which supports the disk motor, the guide shaft base and the lead screw base,
 wherein the pickup is supported by said guide shaft and said lead screw, and a height position of the pickup is adjustable with respect to the support base at at least three of four points and fixed at one of the four points excluding said at least three of the four points,
 said four points respectively corresponding to the two ends of the guide shaft base and the two ends of the lead screw base,
 said one of the four points being located on an outer peripheral side of the loaded disk-shaped recording medium relative to at least two of said at least three of the four points.

13. A disk unit comprising:
 a pickup;
 a disk motor which rotates a disk-shaped recording medium which is loaded;
 a guide shaft base which has two ends and supports a guide shaft;
 a lead screw base which has two ends and supports a lead screw;
 a motor which is supported on the lead screw base and rotates the lead screw by coupling with the lead screw; and
 a support base which supports the disk motor, the guide shaft base and the lead screw base,
 wherein the pickup is supported by said guide shaft and said lead screw, and a height position of the pickup is adjustable with respect to the support base at at least three of four points and fixed at one of the four points excluding said at least three of the four points,
 said four points respectively corresponding to the two ends of the guide shaft base and the two ends of the lead screw base,
 said one of the four points being located on an outer peripheral side of the loaded disk-shaped recording medium relative to at least two of said at least three of the four points.

14. A disk unit comprising:
 a turntable on which a loaded disk-shaped recording medium is clamped;
 a disk motor which drives said turntable;
 a pickup which at least reads information from the disk-shaped recording medium;
 a guide part which movably supports said pickup;
 a support base which supports said disk motor and said guide part;
 a driving motor, and
 a mounting surface which supports said support base, said guide part having ends with adjustable mounting positions so that distances from the ends with respect to said base are adjustable, said guide part including a pair of guides which guide said pickup, first and second guide bases which respectively support the pair of guides, and screws which support ends of the first and second guide bases on said support base, each of the first and second guide bases being supported on said support base at four positions and the screws are adjustable at three of the four positions so that a height position of the pickup is adjustable with respect to the support base at the three positions, said four positions respectively corresponding to the ends of the first and second guide bases, each of the first and second guide bases being fixedly supported on said support base at a predetermined one of the four positions by one of the screws, so that the height position of the pickup is fixed with respect to the support base at the predetermined one position, said predetermined one of the four positions being located on an outer peripheral side of the disk-shaped recording medium relative to at least two of said three positions, said driving motor being supported on one of the first and second guide bases and rotating a corresponding one of the pair of guides by coupling therewith.

15. The disk unit as claimed in claim 14, further comprising:

a chassis; and a tray having said mounting surface, and slidable with respect to said chassis between a replacing position and a loading position, the disk-shaped recording medium being loaded and removed at the replacing position of said tray, said pickup reading the information from the disk-shaped recording medium at the loading position of said tray.

* * * * *